(12) United States Patent
Wolzien et al.

(10) Patent No.: US 10,904,386 B2
(45) Date of Patent: Jan. 26, 2021

(54) CALLER QUEUE PROCESS AND SYSTEM TO MANAGE INCOMING VIDEO CALLERS

(71) Applicant: THE VIDEO CALL CENTER, LLC, Palisades, NY (US)

(72) Inventors: Thomas Wolzien, Grand View-on-Hudson, NY (US); Laurence Thaler, Larchmont, NY (US); Alexander Maisey, White Plains, NY (US); William Milne, Valley Stream, NY (US); Tom Porpiglia, Palisades, NY (US)

(73) Assignee: THE VIDEO CALL CENTER, LLC, Palisades, NY (US)

( * ) Notice: Subject to any disclaimer, the term of this patent is extended or adjusted under 35 U.S.C. 154(b) by 0 days.

(21) Appl. No.: 15/490,671

(22) Filed: Apr. 18, 2017

(65) Prior Publication Data

US 2017/0302795 A1  Oct. 19, 2017

Related U.S. Application Data

(60) Provisional application No. 62/324,314, filed on Apr. 18, 2016, provisional application No. 62/370,238, filed on Aug. 2, 2016.

(51) Int. Cl.
*H04M 3/523* (2006.01)
*H04L 29/06* (2006.01)
(Continued)

(52) U.S. Cl.
CPC ........ *H04M 3/523* (2013.01); *H04L 65/1069* (2013.01); *H04L 65/1096* (2013.01);
(Continued)

(58) Field of Classification Search
CPC ............................ H04M 3/523; H04M 3/5191
See application file for complete search history.

(56) References Cited

U.S. PATENT DOCUMENTS 8,095,400 B2   1/2012  Herde
8,520,900 B2   8/2013  Rhoads et al.
(Continued)

FOREIGN PATENT DOCUMENTS

WO   2015/148693   10/2015

OTHER PUBLICATIONS

International Search Report dated Jul. 7, 2017, issued in International Application No. PCT/US17/28163.
(Continued)

*Primary Examiner* — Nafiz E Hoque
(74) *Attorney, Agent, or Firm* — Honigman LLP

(57) ABSTRACT

A caller queue system and process for a video call-in system. The system includes a waiting room server that connects to a plurality of caller devices over a network. The waiting room server may provide content to the plurality of video caller devices and collects input received from the plurality of video caller devices. A queue managing module connected to the waiting room server prioritizes or sorts the plurality of video caller devices in a queue based on the input received from the plurality of video caller devices. The system allows a user or producer to prescreen and determine the priority of the callers and accept a higher number callers to be connected to the caller queue system.

59 Claims, 30 Drawing Sheets

(51) Int. Cl.
    *H04N 21/2668* (2011.01)
    *H04M 3/51* (2006.01)
    *H04N 21/854* (2011.01)

(52) U.S. Cl.
    CPC .......... *H04L 65/4015* (2013.01); *H04L 65/80* (2013.01); *H04N 21/2668* (2013.01); *H04M 3/5133* (2013.01); *H04M 3/5191* (2013.01); *H04M 2201/50* (2013.01); *H04M 2203/1041* (2013.01); *H04N 21/854* (2013.01)

(56) References Cited

U.S. PATENT DOCUMENTS

| | | | |
|---|---|---|---|
| 8,713,440 B2 | 4/2014 | Bhattacharjee et al. | |
| 8,731,180 B2* | 5/2014 | Benefield | H04N 7/147 348/14.01 |
| 9,635,067 B2 | 4/2017 | Hibbard et al. | |
| 2006/0063655 A1* | 3/2006 | Baenninger | B31B 50/00 493/10 |
| 2007/0233291 A1* | 10/2007 | Herde | G06Q 10/02 700/91 |
| 2008/0192736 A1* | 8/2008 | Jabri | G11B 27/034 370/352 |
| 2009/0204922 A1* | 8/2009 | Bhattacharjee | H04L 12/1827 715/771 |
| 2011/0026777 A1* | 2/2011 | Rhoads | G06F 3/017 382/107 |
| 2013/0346885 A1* | 12/2013 | Singh | H04L 51/04 715/758 |
| 2014/0095406 A1* | 4/2014 | Wynn | H04W 12/08 705/347 |
| 2014/0317508 A1* | 10/2014 | Wolzien | H04N 21/4788 715/719 |
| 2014/0354540 A1* | 12/2014 | Barazi | G06F 3/0416 345/156 |
| 2016/0036869 A1* | 2/2016 | Logan | H04L 65/1083 379/265.09 |
| 2016/0063655 A1* | 3/2016 | Piconi | G06Q 50/20 705/326 |

OTHER PUBLICATIONS

Written Opinion of the International Searching Authority dated Jul. 7, 2017, issued in International Application No. PCT/US17/28163.
Notification of Transmittal of the International Search Report and the Written Opinion of the International Searching Authority, or the Declaration dated Jul. 7, 2017, issued in International Application No. PCT/US17/28163.

* cited by examiner

FIG. 3

CALLER QUEUE PROCESS AND SYSTEM TO MANAGE INCOMING VIDEO CALLERS

CLAIM OF PRIORITY

This application claims the benefit of prior U.S. Provisional Application No. 62/324,314 filed on Apr. 18, 2016, and U.S. Provisional Application No. 62/370,238 filed on Aug. 2, 2016, which is incorporated by reference in its entirety.

TECHNICAL FIELD

The present disclosure relates in general to a process and system for production of a video program. In particular, the present disclosure relates to a process and system for managing multiple video callers during the production of a video program.

BACKGROUND

The advent of inexpensive video telephony via services/software such as Skype® opens the potential for video caller television, which permits video callers from anywhere in the world to be considered for a live video production (broadcast, cable, or internet). The increased popularity in video caller television may result in more callers than the production can handle at a given time, whether callers are connecting directly or called back by call screeners. This creates a critical problem with extremely popular subjects or programs running adjacent to popular shows, e.g., sporting events. During such major events, it is possible to receive up to 100,000 or more callers that the production needs to handle during a single video caller television program related to the event. Additionally, collection of caller information, topics, and basic caller technical adjustments, such as screen position and lighting, all take call screener time once the video caller devices connect to production system. The combination of these problems limits the number of video callers that can be made available to a given video program. This affects the caller experience because video callers outside those immediately serviced by the production system will get "busy" or "call back later" messages.

Thus, what is needed is a process and system for production of a video program that can manage a large multiplicity of video callers. Furthermore, what is needed is a process and system that can provide video callers a better experience when attempting to call into a video caller television program.

SUMMARY

Briefly, and in general terms, various embodiments are directed to a caller queue system for a video call-in system. In one embodiment, the system includes a plurality of video caller devices, which are operated by callers wishing to participate in a live video program. In other embodiments the system includes a plurality of callers that wish to be connected to with certain individuals or groups. The video caller devices may be smartphones, tablets, personal computers or any computing device including a camera. The system also includes a waiting room server that connects to the plurality of caller devices over a network, such as the Internet. The waiting room server may provide content to the plurality of video caller devices it is connected to and may record input received from the plurality of video caller devices. Also, the caller queue system may include a queue managing module in communication with the waiting room server. The queue managing module may automatically prioritize or allow the plurality of video caller devices in the queue to be prioritized based on the input received from the plurality of video caller devices. The system may also include a video call central processing unit that connects with the video caller device at the top of the queue to establish a video call. In one embodiment the video caller may participate in a live video program or broadcast, or the video caller may be connected to participate in a video conference with another individual or group. In one example, the system allows a producer of the live video program to prescreen only the best callers for the program and not waste time with prescreening undesirable callers.

In one embodiment, the caller queue system may include a caller database that is in communication with the queue managing module. The caller database may store the input received from the plurality of video caller devices and may store the queue of the plurality of video caller devices. In certain embodiments, each caller may be assigned a unique caller code to track the caller through the system. The unique caller code may be stored in the caller database.

In another embodiment, the caller queue system includes a caller acquisition server that is in communication with the queue managing module. The caller acquisition server receives information for the next video caller device in the queue and connects the video caller device at the top of the queue to the video call central processing unit or call computer.

In one embodiment, the plurality of video caller devices may include an application stored in memory and the plurality of video caller devices may connect to the waiting room server using the application. Content provided by the waiting room server to the plurality of video caller devices can be presented to the caller through the application. Also, the caller may be able to provide information, including audio and video output from the video caller device's camera and microphone, through the application to the waiting room server.

In another embodiment, the caller queue system may include a waiting room website hosted by the waiting room server. In this example, the plurality of video caller devices connect to the waiting room server through the waiting room website over the Internet. Content provided by the waiting room server to the plurality of video caller devices can be presented to the caller through the website. Also, the caller may be able to provide information, including audio and video output from the video caller device's camera and microphone, through the website to the waiting room server.

In certain embodiments, the content provided by the waiting room server to the plurality of video caller devices (either through an application or website) may include a feed of the live video program, name of the live video program, the name of the host, or the like. In addition, the content provided by the waiting room server may include the queue position of the caller, time on hold, and estimated time until being interviewed on the live program. The content provided by the waiting room server to the plurality of video caller devices also may include questions related to callers using the plurality of video caller devices. Such questions may seek information concerning the caller's name, location, desired IP video application, topic of discussion for the live video program, demographics, interests, IP address, and the like. All information collected from the callers may be collected, aggregated, and stored in a database associated with the system. Other questions, such as polling questions may be presented to all callers and the system may aggregate the results of the polling questions. The content provided by the waiting room server may include terms and conditions that callers may have to accept before participating in the live video program and promotional advertisements. By providing promotional advertisements to the callers in the virtual waiting room may provide another revenue source for the video call company or television programmer.

The calling queue system of one embodiment may perform audio and video quality checks on the plurality of video caller devices connected to the waiting room server. In this way, the calling queue system checks to make sure the video caller device meets the system requirements of a video call center for being placed on air during the live video program.

In one embodiment, the calling queue system automatically prioritizes and/or sorts the plurality of video caller devices in the queue based on input received by the waiting room server from the plurality of video caller devices. In one embodiment, the queue managing module automatically prioritizes the plurality of video caller devices in the queue. In other embodiments, however, the queue managing module prioritizes the plurality of video caller devices in the queue at the direction of a screener or producer. The screener or producer may also reprioritize the queue after reviewing the information collected from the plurality of video caller devices and after communicating with the different callers.

The calling queue system may also include a call tracking module or producer call tracking module in communication with the queue manager. In this embodiment, the call tracking module includes a graphic user interface on at least one display used by the screener that allows the screener to prescreen at least one of the plurality of video caller devices in the queue and prioritize the at least one of the plurality of video caller devices in queue. In other embodiments, the screener may interact directly with the queue manager, which may have a graphic user interface on at least one display used by the screener that allows the screener to prescreen at least one of the plurality of video caller devices.

Various embodiments may be directed to a calling queue process for a video conference, video call-in television broadcast, or web broadcast. The described calling queue process may also be used for a closed circuit presentation or other types of media. The calling queue process includes connecting a plurality of video calls from different callers to a waiting room server over a network. The network may be the Internet or any local or wide-area network. Further, the process collects information from the different callers, and uses this information to prioritize the plurality of video calls from different callers in a queue. The calling queue process may prioritize the callers based on the information collected from the individual callers. In addition, the calling queue process may include storing the queue in a database connected to the waiting room server. The calling queue process selects the next caller at the top of the queue to be aired on the live video program. In one embodiment, the process includes connecting the caller at the top of the queue to a video call central processing unit to establish a video call to be aired.

In one embodiment, the process includes connecting a plurality of video calls to a waiting room website hosted by the waiting room server. In other embodiments, the process may connect a plurality of video calls to the waiting room server through an application stored on the device used to make the video call.

In certain embodiments, the calling queue process further includes providing content to the different callers over the network while the callers are connected to the waiting room server. The content may include a live feed of the video call-in television broadcast. In certain embodiments, the video stream of the call-in broadcast is assigned by the system to match the current call-in broadcast. The caller may view the live feed through the application on the video caller device or through the waiting room website connected to the waiting room server. The content from the waiting room server may include questions to be answered by the different callers. Also, the content may include terms and conditions that the callers may have to agree to before participating in the video call-in television broadcasting, Internet-based broadcast, closed circuit presentation, or other types of media.

While in the virtual waiting room, the process may include testing audio and video quality of the plurality of video calls from different callers.

The process may further include prioritizing the plurality of video calls from different callers in the queue automatically by using a queue managing module. In another embodiment, this is performed by the waiting room server. The queue of callers may be reprioritized at the direction of a screener who views the callers. The screener may reprioritize the queue after prescreening or communicating with the individual callers. The process may also categorize the callers in the queue based on any information collected from the caller. Different categories may be based on topics that the caller would like to discuss on the program (topic may be selected from a prepared list or entered by the caller), age, location, or any other characteristic. In this way, the screener or the system may be able to sort through and chose the caller to be first in the queue to go on air. It has also been contemplated that the plurality of video calls from different callers in the queue are prioritized at the direction of a screener.

The term "television video" includes any form of video signal used within the technical aspects of traditional live television production, including analog, digital, component, composite, and SDI, including video signals of those types after conversion from computer based video outputs such as DVI, HDMI, and VGA, but excludes video processing within a conventional computer that produces normal computer video monitor outputs such as DVI, HDMI, and VGA. In the context of television video, the terms "convert", "converts", or "converting" video into television video are synonymous with the terms "generate", "generates", or "generating" television video. Description of the embodiments as a television video or television broadcast is by example only, not by limitation, and it should be understood that the caller queue system can be used to produce other types of media, including an Internet-based broadcast or closed circuit presentation.

The terms "a" and "an" are defined as one or more unless this disclosure explicitly requires otherwise.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements possesses those one or more steps or elements, but is not limited to possessing only those one or more elements. Likewise, a step of a method or an element of a device that "comprises," "has," "includes" or "contains" one or more features possesses those one or more features, but is not limited to possessing only those one or more features. Furthermore, a device or structure that is configured in a certain way is configured in at least that way, but may also be configured in ways that are not listed.

Skype® is used as an example of an internet protocol video service, but other branded and generic IP video services and applications may be substituted.

Video Distributor can include entities which package and/or distribute audio, video, and/or multi-media content directly to consumers or indirectly as wholesalers, such distribution being via broadcast television, cable television, satellite television, telephone systems, data, IP video, audio/video through social media, the internet, and any other form of distribution using wired or unwired means.

Other features and associated advantages will become apparent with reference to the following detailed description of specific embodiments in connection with the accompanying drawings.

DESCRIPTION OF DRAWINGS

FIG. 3 depicts a screen shot of one example of a website hosted by a waiting room server.

DETAILED DESCRIPTION

Figure 1:
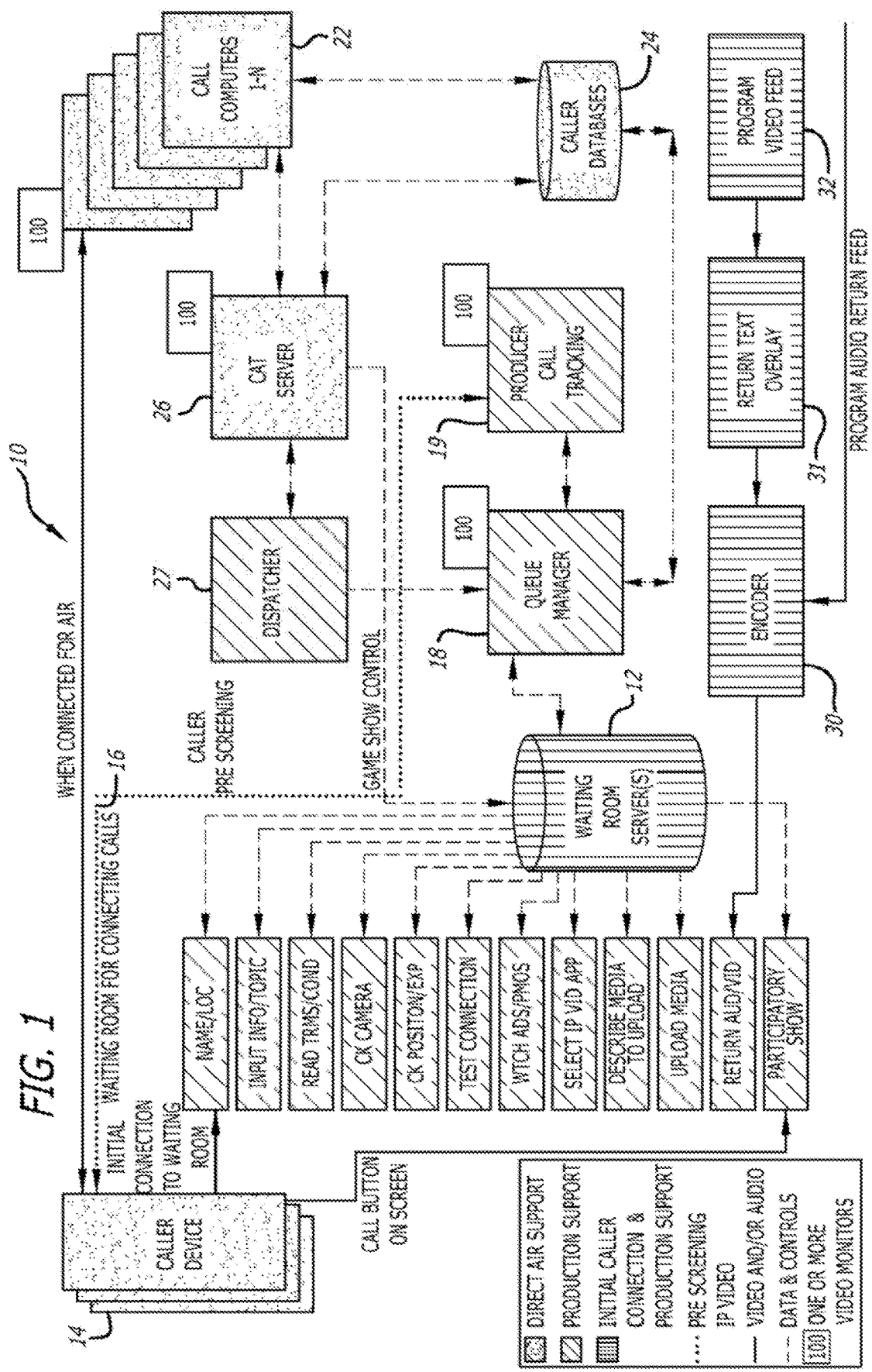
FIG. 1 is a schematic diagram depicting a video call center caller queue system.

A caller queue process and system that permits callers to participate in a live video production, which may be a television broadcast, cable programming, closed circuit presentation, social media programming, or Internet-based programming, is disclosed. According to one embodiment, the caller queue system may be added to the front-end of an existing video call center system or it may be a part of a complete video call center system having one or more call computers. It should be understood that the caller queue system also can be used with a single call computer. The current caller queue system and process may allow an unlimited number of callers to indicate that they wish to call a video program and then be prioritized in a queue before editorial screening occurs. Furthermore, the callers in the queue may be pre-screened, for content as well as a technical quality check. One embodiment of the caller queue process and system allows the callers to be prioritized and pre-screened before connecting the caller to a video call computer or video call processor for final editorial screening and airing.

In one embodiment, the caller queue system and process will function as follows. Instead of connecting directly to a video call computer, which is common in live video productions, video callers to a video program would connect to a virtual "waiting room." In one embodiment, the waiting room would be a website hosted by a local or remote server. Callers could connect their video caller device to the website via a web page button or hyperlink or an application on the device. The caller device may be a smartphone, tablet, personal computer, or any computing device. In one embodiment, the waiting room server could provide a live feed of the video program that the caller is trying to reach. In addition the waiting room server could provide advertisements and promotions to callers. While on the waiting room website, the caller queue system could request certain information from the caller that would be used to prioritize the callers in a queue. The requested information would relate to the caller's appearance on air when a video link is established. By way of example only and not by way of limitation, the requested information may include caller name, location, topic of discussion, description of media to upload to the program, any media to upload to the system, and selecting a desired IP video application (e.g., FaceTime, Skype, etc.) that the caller would prefer to use to connect to the live video production. In other embodiments the system may automatically check the caller device and determine which applications are present on the caller device, such as FaceTime or Skype. Still further, the terms and conditions for appearing on the live video program could be presented to or made available to the caller through the waiting room website. The quality of the audio and video signal outputted from the caller's device can be checked while in the waiting room website, along with testing the connection to the server. Furthermore, the position of the caller in the video, the connection quality, the sound quality and the light exposure can be checked while the callers are in the virtual waiting room.

In one embodiment of the system and process, the information and caller status is relayed to the program producer via a database which permits categorizing based on topics, caller history with the program (or any call-in program), location, or caller characteristics. The program producer can either take the callers as they become available, or determine those most likely to benefit the on air program. Once a caller reaches the top of the queue, whether determined automatically or by producer intervention, the caller's information is routed by a dispatcher application to the next available call computer capable of handling the caller's IP video application, e.g., a Facetime call would be routed to an Apple computer, and the outbound call to the caller is completed. The system may include a lookup table storing numbers or identifications of call computers and the applications that each call computer supports. The system may optimize the assignment of a call computer to a caller based upon the caller's video application and the capability of the available call computer. The system may only connect the next caller in the queue if a compatible caller computer is available, otherwise, the system skips to the next caller in the queue.

When connected, the call screener system is provided with the caller's name and topic information, which automatically populates a text overlay and host topic screens, subject to call screener approval. When the screener completes the necessary technical, content, and propriety checks, the caller is cleared in the normal manner and becomes available for inclusion in the video show. When the callers are no longer needed on the air, they are returned to the caller queue web site to view the remainder of the program, or to be recalled for air by the operators. Callers may also be returned to the queue if the caller disconnects from the waiting room server (hangs up). In certain embodiments, callers may be removed from the queue if the caller device disconnects or the caller hangs up.

The caller queue system for a video call-in television (or live video program) can have a plurality of major components. Referring now to FIG. 1, the caller queue system 10 includes one or more waiting room servers (or virtual servers) 12 that connect to a plurality of video caller devices 14 wishing to join a live video production. The waiting room servers 12 connect to the plurality of caller devices 14 over a network, such as the Internet or cellular network. The waiting room servers 12 set up a virtual waiting room 16 for callers using a video caller device 14. The video caller devices may be smartphones, tablets, personal computers or any IP video device. It has been contemplated that the caller queue system could function in nearly the same manner when connecting to caller devices that are not video capable, or for viewer call-in programs rather than live video programs.

In one embodiment, the waiting room server 12 may provide content to the connected plurality of video caller devices 14. Further, the waiting room server 12 may record any input received from the plurality of video caller devices. The content provided by the waiting room server 12 could be any data or a feed of the live program that the caller is trying to reach. While connected to the waiting room 16, the caller queue system 10 could request certain information from the caller that would be used to prioritize the callers in a queue. The requested information would relate to the caller's appearance on air when a video link is established. Also, the quality of the audio and video signal outputted from the caller's device can be checked while in the waiting room website.

Figure 2A:
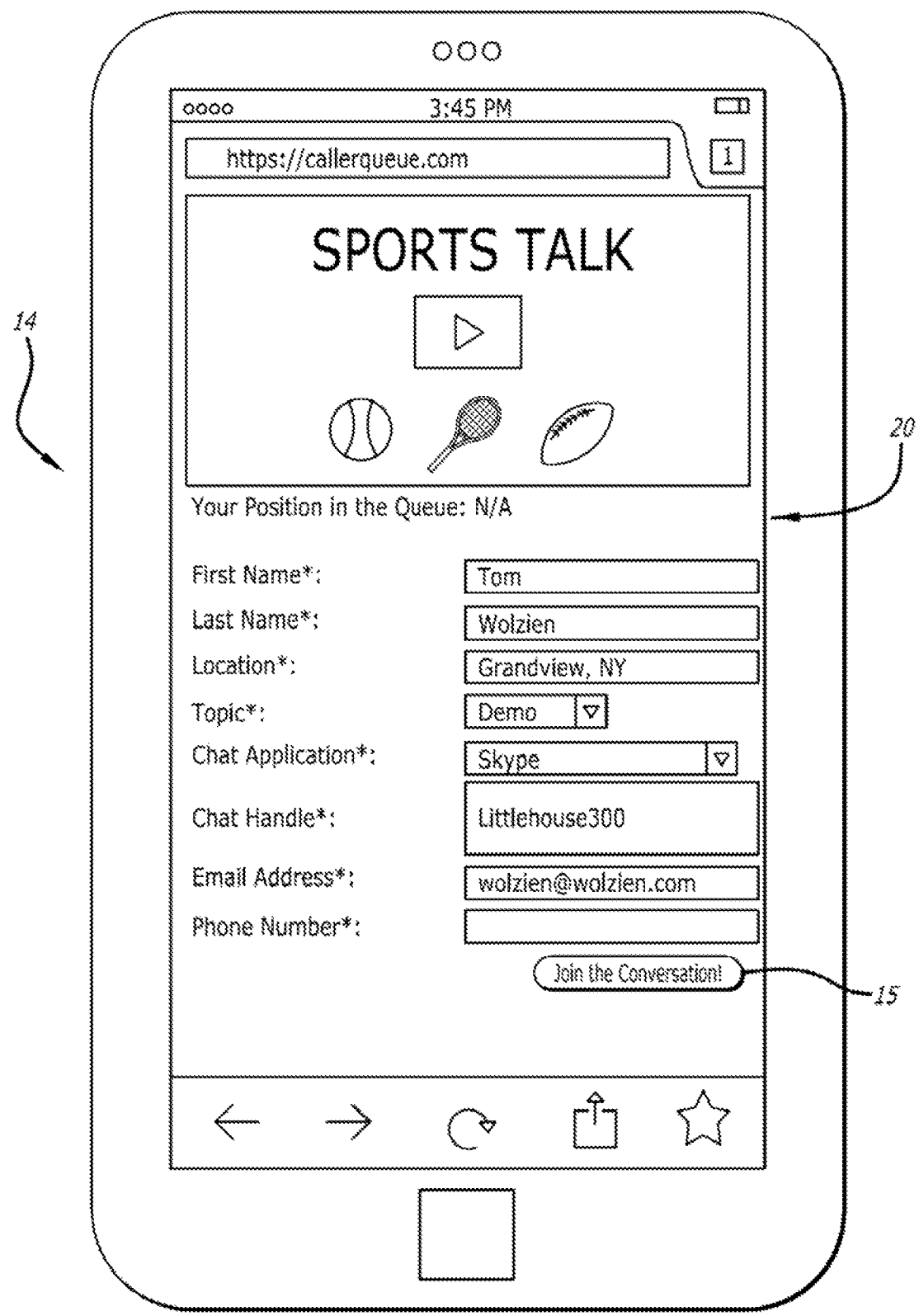
FIGS. 2A-2B are schematic diagrams of a mobile calling device running an application that connects the caller device to a waiting room of a live video program.
Figure 2B:
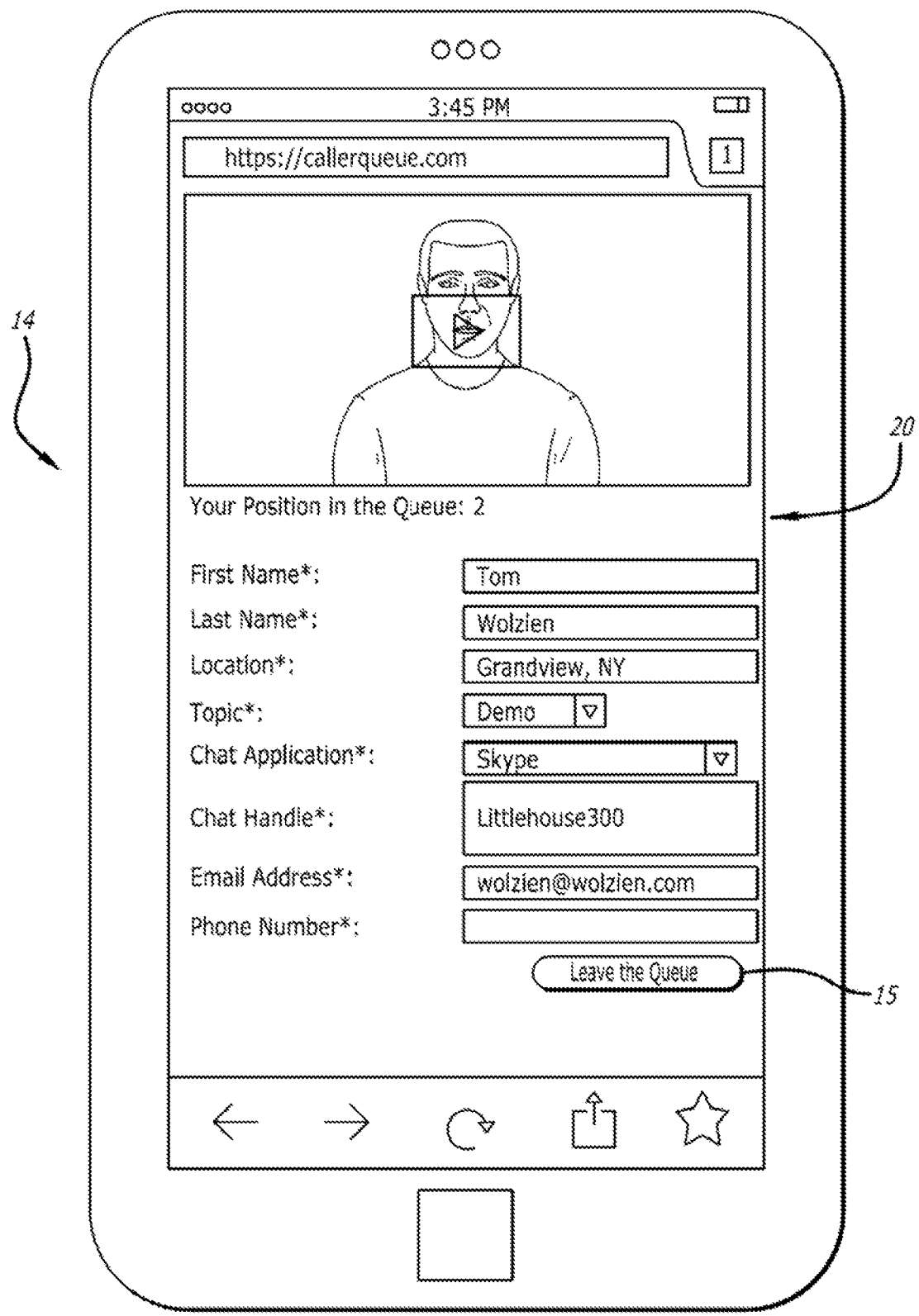

In one embodiment, the video caller devices 14 may include an application stored in memory of the device that allows the caller to connect to the waiting room server 12 using the application. A screen shot of one example of a user interface 20 of the application is shown in FIG. 2A. As shown in this example, the user interface includes a virtual "call" button 15 that when pressed by the caller connects the video caller device 14 to the waiting room server 12. The caller may be able to provide information, including audio and video output from the video caller device camera and microphone, through the application to the waiting room server 12. The application may allow the user to view the live video program on the device as shown in FIG. 2B. The status of the caller's position in the queue may also be shown on a display including a user interface 20, as shown in FIG. 2B. Further, additional content provided by or through the waiting room server 12 may be displayed on the video caller device.

Figure 3:
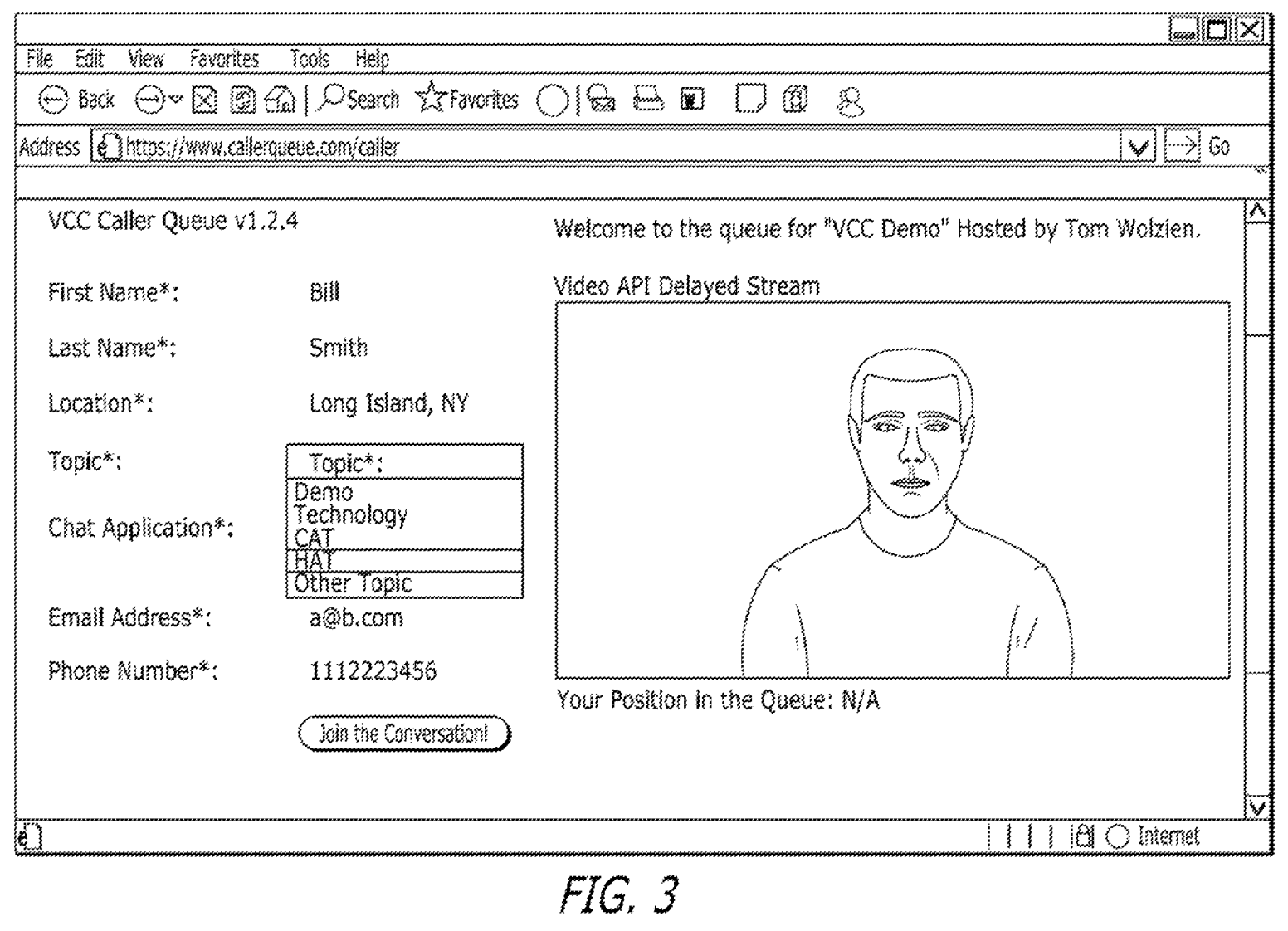

In another embodiment, the caller queue system 10 may include a waiting room website 28 hosted by the waiting room server 12. A sample screen shot of the website is shown in FIG. 3. In this example, the plurality of video caller devices 14 connect to the waiting room server 12 through the waiting room website 28. Content provided by the waiting room server to the plurality of video caller devices can be presented to the caller through the website as shown in FIG. 3. Also, the caller may be able to provide information, including audio and video output from the video caller device's camera and microphone, through the website to the waiting room server. Input boxes and/or drop down menus may be used to input caller information. As shown in FIG. 3, a call button or "join the conversation" button may be included on the website 28. After a caller alters his information, he may click the "join the conversation" button in order to place himself in the queue.

While watching a feed of the live video program on the application or website, the waiting room server 12 or other component of the caller queue system may provide the caller with other content, including advertisements that may create an additional revenue stream for the production company. It is also possible that while in the waiting room, the waiting room server 12 could present the caller with the terms and conditions for the caller's appearance on the program. The server 12 could present the caller with an option to indicate an agreement to the terms and conditions. The server may present a form to the caller to collect information concerning the age, location, topic to discuss (possibly limited to those in that program), and other characteristics of the caller. The caller may be requested through the application or website to enter personal contact information such as email and mobile phone number, upload a video or still picture to go along with the video call or be viewed without the caller on air, and describe the uploaded video or still picture.

In one embodiment, the caller queue system may automatically reject a caller from participating in the live video program if the caller is under the appropriate age determined for that program. Callers may be rejected by the calling queue system for other reasons set by the producer, such as including inappropriate content in the application, uploaded media, or through the video of the video caller device 14. A caller may be rejected for having a bad history with the production company. In this embodiment, a caller's history with the production company is stored in a database for future reference, and may even be used to help prioritize callers for a current call-in program.

Through the form presented by the server 12, callers may select the IP video application the caller wishes to use and caller's video address through the application or website. Further, callers could be allowed to test a connection to the waiting room server to ensure that the video caller device meets all of the system requirements of the caller queue system. The application or website could be used to line up head position in anticipation of being selected to participate in the live video program, and also perform a quality check on the lighting or sound the caller is using for the video call.

Additionally, the waiting room 16 may offer callers the opportunity to subscribe to a show account, interact with show staff or other viewers, vote on show content or comment on the show off camera via social media posts. While setting up a call in the waiting room 16, the caller queue system 10 would automatically measure connection information and grab a screen shot of the caller, which would be made available to the program operators (producers, screeners, or host) along with the other caller data.

In one embodiment, the calling queue system 10 may include a queue managing module 18 that is in communication with the waiting room server 12. The queue managing module 18 may be a virtual machine on the waiting room server, or the queue managing module may include a separate processor, one or more video monitors, and a user interface. One of the operators, such as a producer, a separate screener, or a host of the live video program may access information from, monitor or interact with the video callers through the queue manager 18 in one embodiment. The queue managing module 18 sorts caller information from the waiting room server or database associated with the waiting room server and may prioritize the plurality of video caller devices 14 in a queue based on the input received from the plurality of video caller devices and decisions from the operators.

As shown in FIG. 1, in one embodiment, the calling queue system 10 includes a call tracking module or producer call tracking module 19 that is in communication with the queue managing module 18. The call tracking module 19 may also be in direct communication with the plurality of caller devices 14 in the waiting room 16 for prescreening purposes. In one embodiment, the call tracking module 19 includes a graphic user interface on at least one display used by the screener that allows the screener to gain information presented by the callers and to prescreen at least one of the plurality of video caller devices in the queue. The call tracking module 19 may prioritize the plurality of video caller devices in the queue or direct the queue managing module 18 on how to sort and prioritize the video caller queue. In other embodiments, the screener may interact directly with the queue managing module 18, which may have its own graphic user interface on at least one display used by the screener that allows the screener to prescreen at least one of the plurality of video caller devices. The screener may also reprioritize the queue after reviewing the information collected from the plurality of video caller devices and possibly communicating with the different callers of the plurality of video caller devices.

Figure 4A:
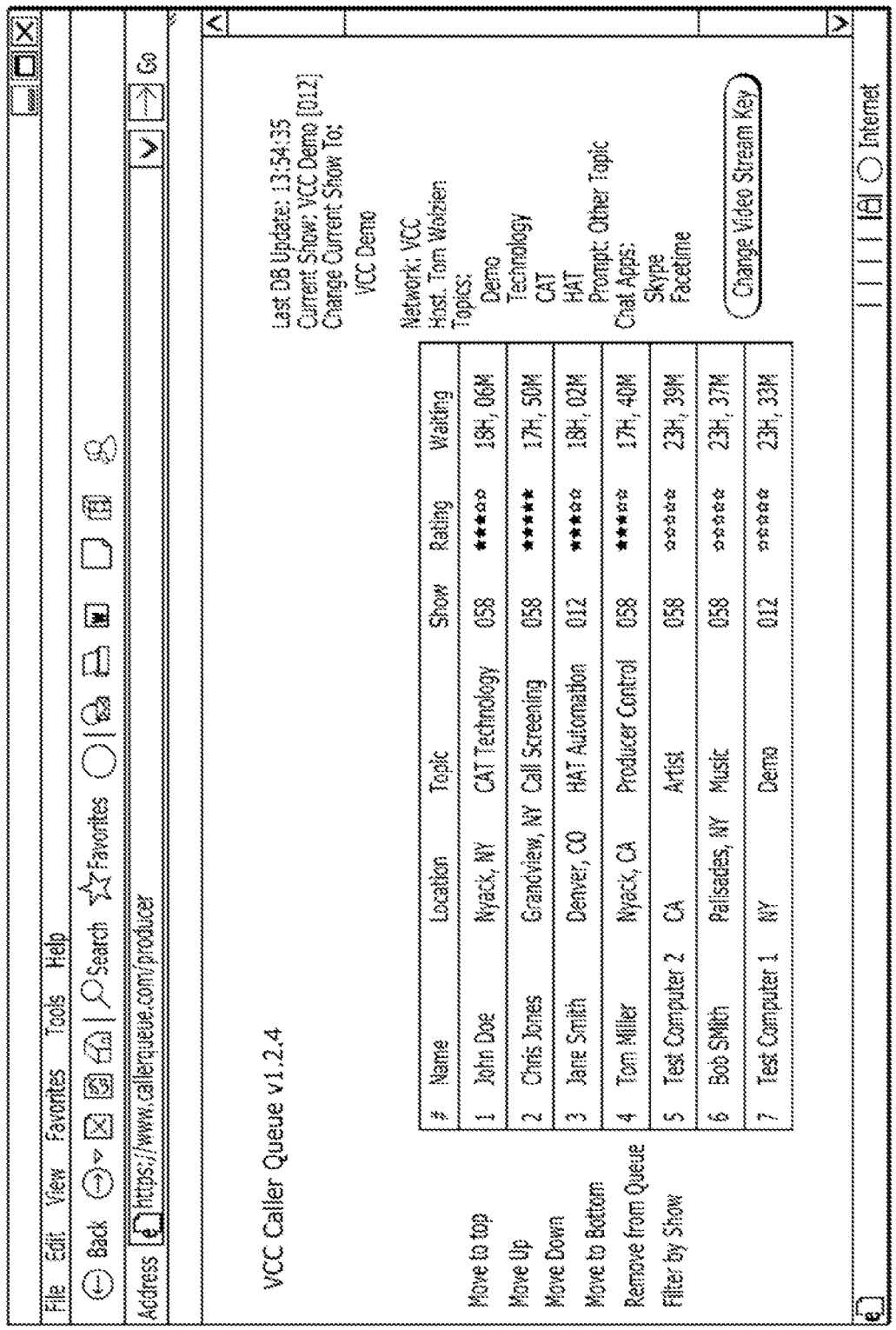
FIGS. 4A-4C depict screen shots of one example of a user interface for a producer showing the caller queue.

FIG. 4A shows a user interface on a display, which may be a website for a producer or screener. The producer user interface allows the producer to reorder callers in queue. In one example, the producer uses buttons on the user interface, such as "move to top," "move down," "move to bottom," and "remove from queue," to reorder or remove callers. In other examples, the producer or screener may manage the order of priority through drag and drop, touchscreen operation, or any other interface to reorder the priority of callers. The producer user interface may also allow the producer to filter the caller queue and view information about the callers or about the video call show the caller is trying to connect. In one embodiment, the producer user interface could also allow the producer to directly communicate with the caller.

Figure 4B:
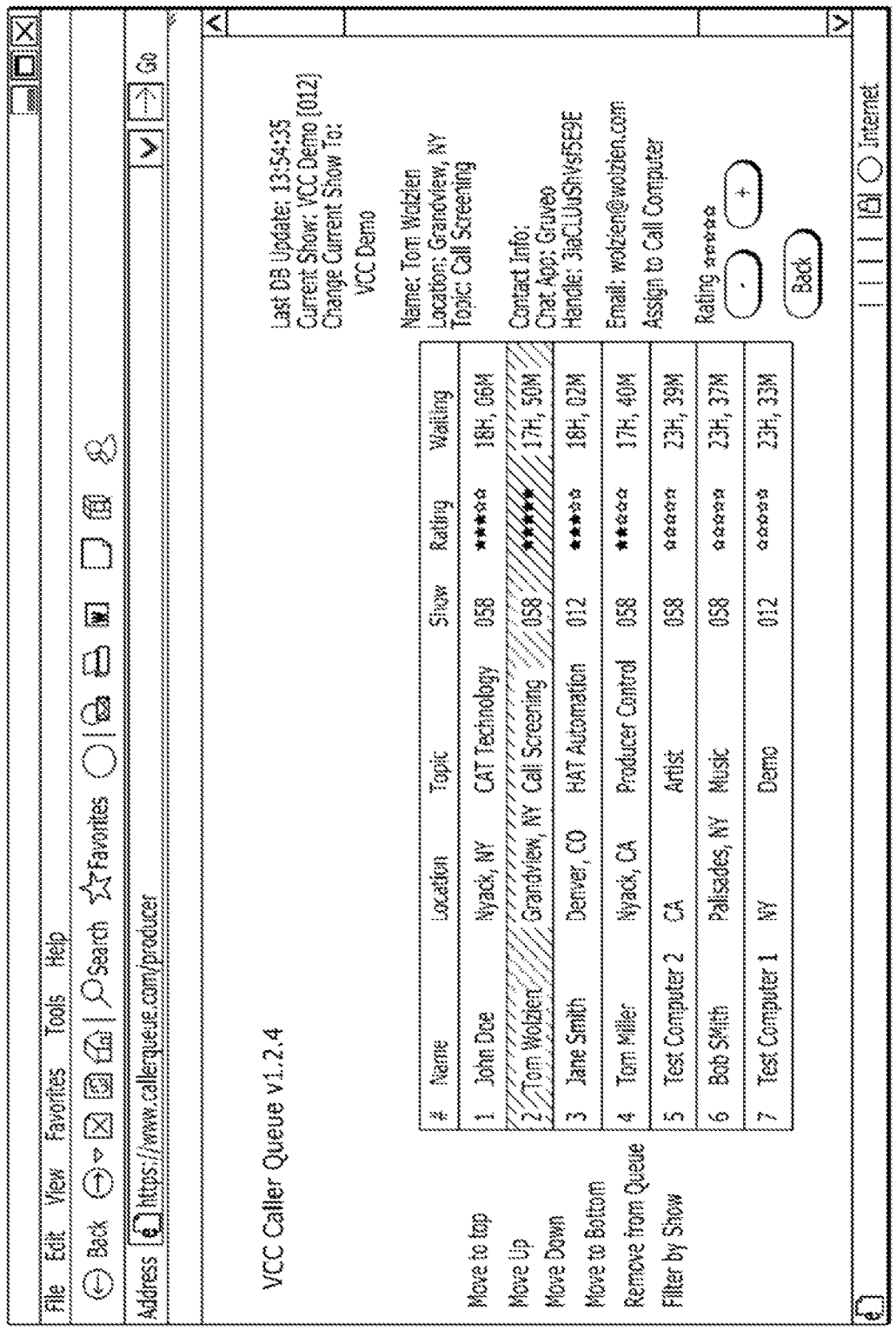

FIG. 4B shows additional information on the producer user interface, including information about a specific caller that is highlighted. The producer user interface may allow the producer to rate the caller on a 5-star system as shown in FIG. 4B. Any type of ratings system may be used.

Figure 4C:
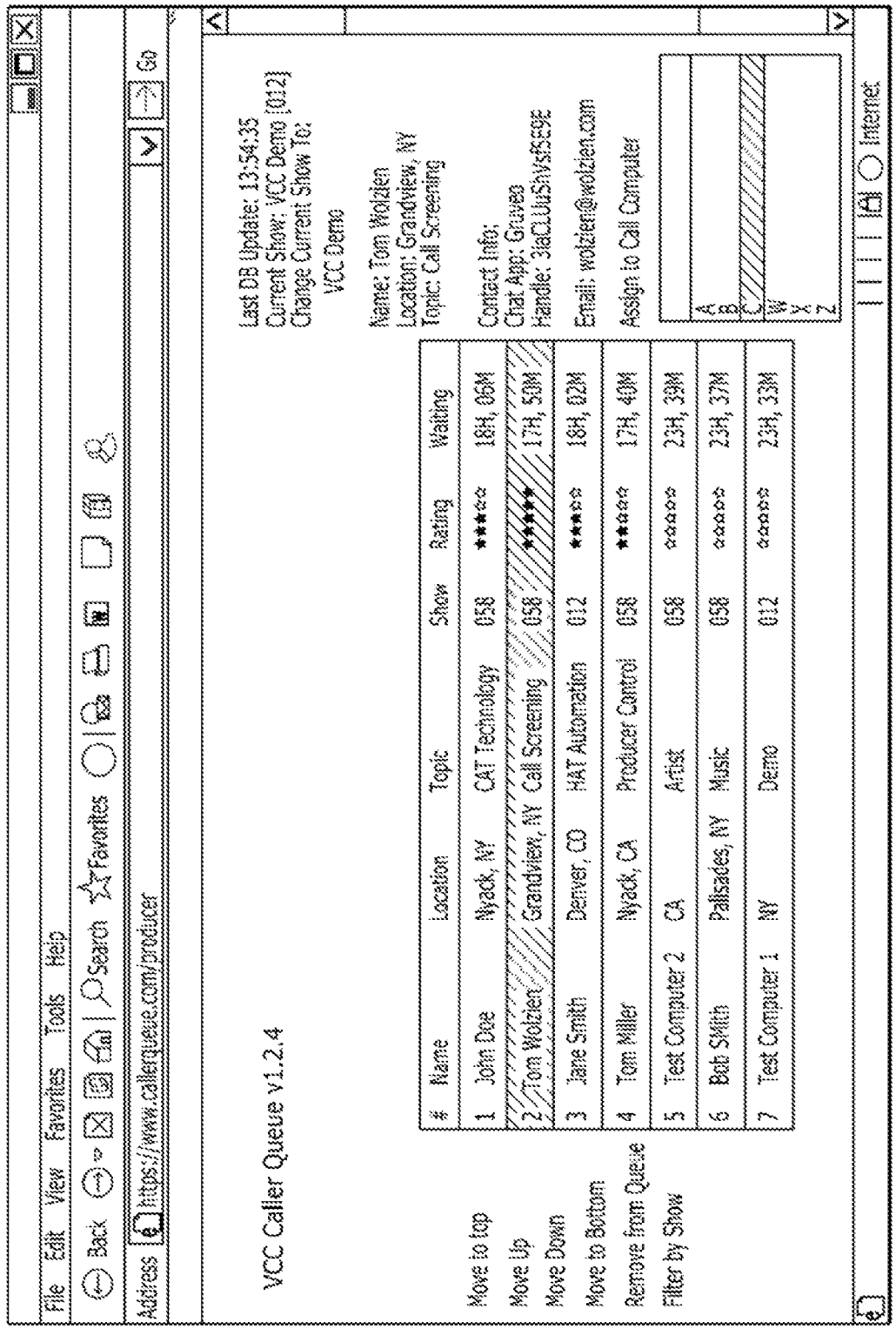
Figure 5:
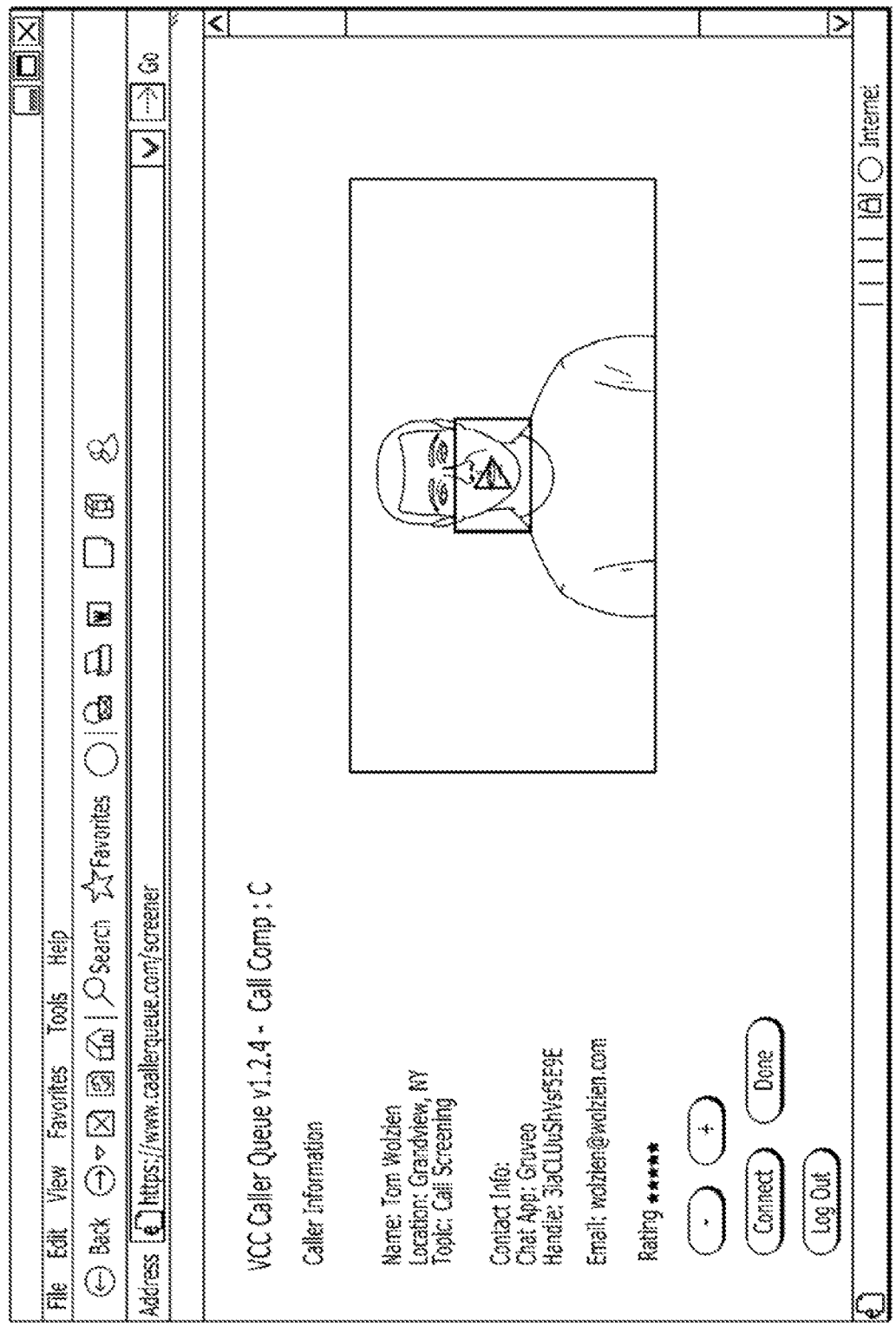
FIG. 5 depicts a screen shot of one example of a user interface for a screener showing a connection with a caller.

FIG. 4C shows additional features on the producer user interface, including a feature to assign an available call computer 22 to a caller. The producer or a separate screener may also be able to communicate directly with a caller through a screener user interface as shown in FIG. 5. The screener will be able to view and hear the caller through a window and speakers, and view, edit or enter caller information and notes. As shown in FIG. 5, the screener may also be able to rate the caller. Caller ratings can be stored for future reference.

The system 10 may include one or more video call central processing unit or call computer 22 that connect with the video caller device at the top of the queue to establish a video call for the live video program. The call computers 22 may be virtual machines or dedicated machines with processors that each connects with one video calling device as determined by an operator of the call queue system.

The caller queue system 10 may include a caller database 24 that is in communication with the queue managing module 18 as shown in FIG. 1. The caller database 24 may store the input received from the plurality of video caller devices while in the waiting room 16 and may store the queue data of the plurality of video caller devices. The caller database 24 may also store any categories or rankings of the video callers it receives from the queue manager 18. In another embodiment, the caller database 24 may store data received directly form the waiting room servers 12. The call tracking module 19 may instruct the queue managing module 18 on storing caller information to the caller database 24. The caller database 24 may store the caller history. In one embodiment, multiple databases are associated with the system and any data read from or written to the database is modular, which permits identification of the individual database to read from or write to.

In another embodiment, the caller queue system 10 includes a caller acquisition technology (CAT) server 26 that is in communication with the queue managing module. The CAT server 26 receives information related to a video caller device 14 at the top of the queue and connects (manually or automatically) the video caller device at the top of the queue to the video call central processing unit or call computer 22. The information sent to the CAT server 26 may include unique caller information, such as caller handle, unique identifier, subject or topic the caller would like to discuss, caller location, video application, and the like. The CAT server 26 may also be in communication with the caller database 24 and the waiting room servers 12 as shown in FIG. 1.

In yet another embodiment, the system 10 may include a dispatcher 27 that is in communication with the CAT server 26 and the queue managing module 18 as shown in FIG. 1. The dispatcher's role may be to automatically assign available call computers 22 to the callers at the top of the queue. The assigned call computers may be of the type to support the video application selected by the caller. The dispatcher 27 receives information from the CAT server 26 when a call computer is available for a new caller and pairs that with information from the Queue Manager 18 on the connection information of the next caller in the queue. In one embodiment, the dispatcher 27 will instruct the CAT server 26 to initiate the call computer 22 to complete the call to the video caller device 14. In certain embodiments, any streaming video of the live program being fed to the caller device may be paused and the caller may be informed that they are about to be connected to a call computer to participate in the broadcast. Depending on the desires of the producer, any content being provided by the waiting room server may be suppressed, minimized or hidden before the caller device is connected to a call computer. Once the video caller device 14 is connected to the call computer 22, the caller is ready to be transferred to a backend of a video call center (see below) so that the caller can be placed on the air during the live video program.

The waiting room servers 12 are fed video audio signals showing the content of the program through one or more encoders 30, which encode the video and audio signals for use over the Internet. These video and audio signals may have a return text or graphical overlays 31 inserted to provide information to the callers. In some implementations the order of these items will be reversed such that the encoder 30 is first and the return text overlay 31 is second. Alternatively, if the program video feed 32 is from a virtual machine, all three items encoder 30, return text overlay 31, and program video feed 32, may be located in a single or multiple servers.

In an alternate embodiment, a producer(s) can prescreen the caller in the queue by using the caller-entered data to connect the producer call tracking module 19 to the video caller device 14. This allows the producer to pre-interview the potential caller and perform basic quality checks prior to committing the caller to use a position within the Call Computer sub-system. Once a caller is pre-screened using this in-queue screening, the caller would be returned to the queue in a position determined by the producer(s).

The caller queue system is a front end system that connects to a video call center system, such as the one described below. It should be understood that the entire queue operation, or any managing module or server of the caller queue system, could be virtual machines operating in the cloud. To understand the connection between caller queue system and the video call center system, in one embodiment, the CAT server 26 as shown in FIG. 1, may connect to the video call central processing units or call computers A shown in FIG. 6, the call computers 22 are represented as blocks A. An example of a video call center will now be described.

A video call center process and system can create cost effective video programs for television transmission from a multiplicity of simultaneous video callers. Related Video Call Text Overlays can aid in tracking and identifying on air the multiplicity of simultaneous callers. In certain embodiments, the on-air talent can do the video mixing of selected callers with a touch screen. Related audio switching and conferencing of video callers can be done by a specialized switching control device.

The video call center process and system can efficiently permit development of call-in video programs that work with the low level economics available in relatively small-audiences available to today's fragmented video distribution. The production of live video call-in programs can operate with as few as two people, including a producer and on-air talent as seen in talk radio.

The producer screens and coordinates incoming separate internet video calls and inserts textual information (i.e.: "Bill, Chicago") into the computer video display for each call, thus providing the on-air talent with the information immediately necessary to put a video call on the air. In some embodiments, the text can be inserted before the computer video is converted to television video.

The on-air talent can physically select the calls that will be aired via a touch screen (and/or conference mixer controller) and specialized audio equipment. With the imbedded textual information in the picture, the on-air talent can, with no other information, tap the touch screen and smoothly transition to the new caller (i.e.: "Bill's up on the line now, Hi Bill. What's up in Chicago?")

Figure 6:
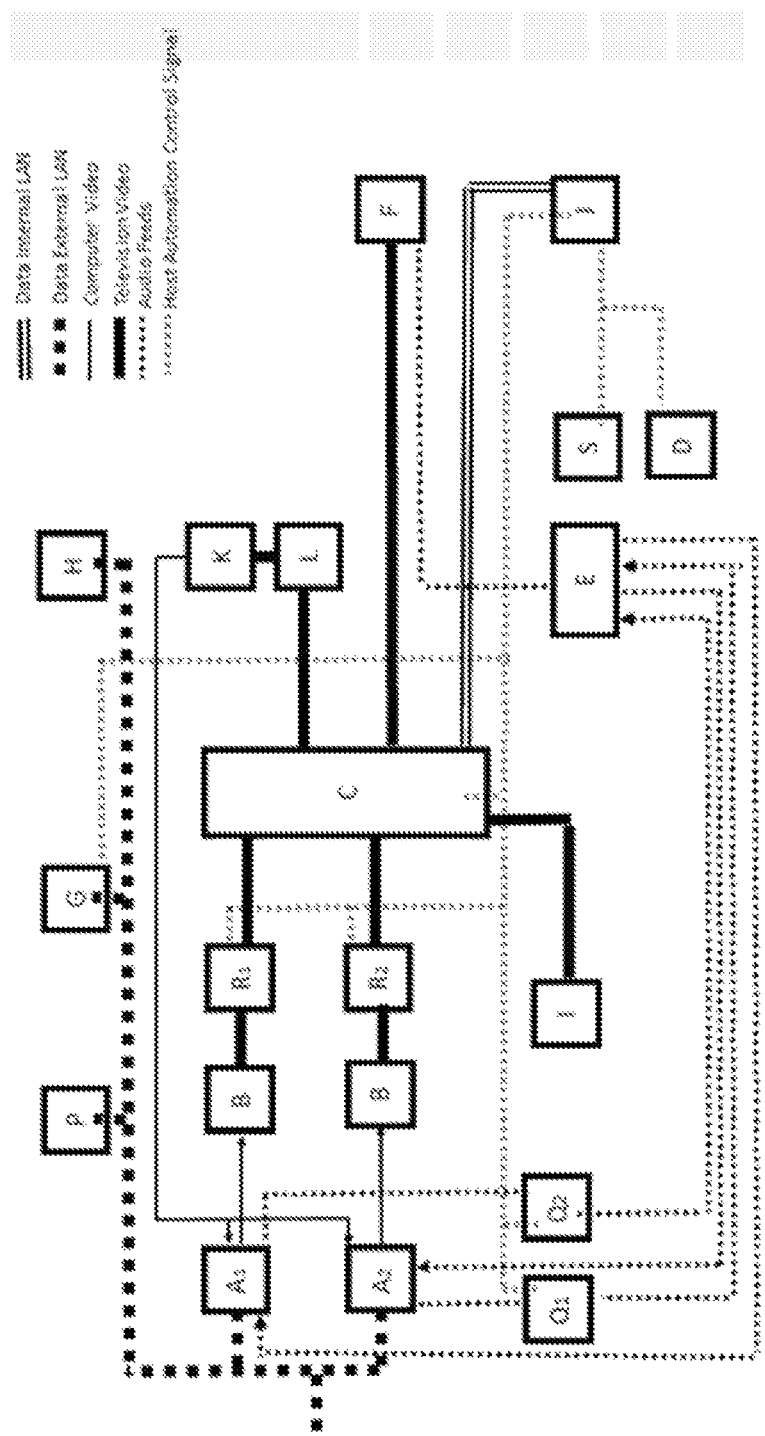
FIG. 6 is a schematic diagram depicting a video call center system.

The system can have a plurality of major components. As shown in FIG. 6, Block A (A1 and A2) can be two or more Video Call Central Processing Units (Video Call CPU) (hereinafter to include a virtual machine performing the necessary functions of the Video Call CPU) which can perform the following actions in real time for each video caller:

a) making or receiving the video call (with associated audio) via the internet, b) generating selected text identifications or Video Call Text Overlay for the caller (i.e.: Bill, Chicago) and positioning such text over the call video from manual or automatic entry, c) selecting the video sizes and positions on the screen prior to the call video with text being converted to a video signal usable in live television production, d) Scaling the text and it's position to match the resolution of the screen e) collecting imbedded information about the video call (including from the video call applications) and preparing such information for storage in a database with other call characteristics, f) preparing selected text identifications from b (above) for storage in a database with other call characteristics, g) permitting entry of producer notes in real time both in preparation for storage in a database and a separate display for talent, h) storing all information in a local database, i) communicating with and stores information in a database run through a different central processing unit, j) displaying information previously stored in a local or distant data base, k) returning audio to the caller, l) returning video to the caller, m) outputting an audio signal for presentation to other equipment, either through baseband or IP, and n) receiving timing reference for the audio and or video outputs and locking those signals to the reference.

In some embodiments, a Call CPU performing the above-mentioned functions can be dedicated to each separate caller that is on-air or is being prepared for air. The number of Call CPUs is variable depending on the number of calls that are desired to be in the screening process and standing by in queue for a particular on-air application.

Block B is a Television Video Converter which takes a selected portion of the video through the standard computer video output (such as DVI or VGA) of the CPU/Block A (including the Call Text Overlay) and converts the video into a television video signal usable by normal television production equipment, such as video via a Serial Digital Interface (SDI) or via an IP connection. The Video Converter also has the capability of receiving a locking source and method to synchronize the output with the remaining systems. The Video Converter may be a stand-alone device, or be included within the container of the Video Call CPU as an additional process or board. In the preferred embodiment, a Television Video Converter will be dedicated to each CPU, however various video call feeds may be preselected through sub-switches for processing by a single Television Video Converter. This will limit the number of call options available to the on-air talent, but will reduce the number of Television Video Converters necessary.

Block C is a television video mixing apparatus which permits selection of various television pictures from the multiplicity of Call CPUs and related Television Video Converter sources, or from other video sources necessary to production. It permits multiple signals to be displayed on the screen simultaneously and to create a smooth transition to subsequent displays. The television video mixing apparatus is controlled through automation via controller J. The video output of Block C goes to Block F for preparation for transmission and also returns directly to each Video Call CPU (after being converted back into video format acceptable to computers) or by way of a text generation system (Block L) to provide to the caller both the picture currently on the air plus textual information to the caller.

Block D is a Touch Screen Display selection apparatus used by the on-air talent to select the next caller to air from the multiplicity of callers provided through Blocks A and B as made available through Block C directly or via the scripting system of the Host Automation Module (Block S) and related video and/or audio relays (Blocks $R_1$, $R_2$, $Q_1$ and $Q_2$). The video in the multiple boxes in the touch screen are from each awaiting caller, and each such caller's video contains the Call Text Overlay identifier (Bill, Chicago) from Block A(c). The Touch Screen Display also permits selection of pre-recorded videos, stills and audio clips, as well as signaling transitions to down stream master control commercial insertion equipment.

Block E is a specialized audio mixer capable of providing discrete audio returns to each Video Call CPU (and thence to the individual caller) so that all callers can hear each other and the talent, but not themselves. This is necessary due to the various processing and transmission delays in internet video calling which could result in a significant, and very confusing, delay in the caller's voice returning to him/her. Such discrete return audio feeds are known in the trade as an audio matrix or "mixed minus."

Block F is the encoding process/unit to prepare the final audio and video signal for transmission live to a video distributor. In an alternative embodiment, Block F is incorporated at the output stage of a video mixing device, Block C.

Video distributor can include entities which package and/or distribute audio, video, and/or multi-media content directly to consumers or indirectly as wholesalers, such distribution being via broadcast television, cable television, satellite television, telephone systems, data, IP video, the internet, and any other form of distribution using wired or unwired means.

Block G is a separate CPU for the Video Call Database, optional Producer Central Control to the Video Call CPUs, and communication point between the Call CPUs and the Host Automation Module (Block J) for the purpose of indicating to the Host Automation Module calls that have been cleared by the Producer. As well as identifying the current show and show settings.

Block H is the Information Screen for the Talent containing text messages from the producer regarding topics or characteristics of the callers and other information necessary for coordinating a television program. Such messages may also incorporate caller information retrieved from the Video Call Database, Block G.

Block I is one or more video cameras photographing the on-air talent, or other video sources related to the program then being produced.

Block $R_1$ and $R_2$ are Video Relay switches that blocks the incoming call video until the call is cleared by the Producer and the Relay is closed to permit the video to pass. In other embodiments, the relay switches may be replaced with a serial video switcher controlled via automation or a system that permits an IP video stream to be selected (or muted).

Block $Q_1$ and $Q_2$ are Audio Relay switches that blocks the incoming call audio until the call is cleared by the Producer and the Relay is closed to permit the audio to pass. In other embodiments, these Audio Relay switches may be replaced by an analog audio switcher or a function being embedded in the digital audio processing engine.

Block J is a specialized, ergonomically designed conference mixer-controller or an automation system Host Automation Tool Module (HAT) that permits the talent to add audio and/or video of multiple callers when desired, restore the audio system to a single caller as needed, or stop all the caller video and audio if necessary. The conference mixer-controller can also handle both audio and video. Block E can have a series of relays before the audio mixer to control on and off of the audio (Blocks $Q_1$ and $Q_2$) and/or video (Blocks $R_1$ and $R_2$) signals. In some embodiments, by sending an audio control signal, the on-air talent's controller (Block J) can be designed to drive the series of relays (via various scripts on a Host Automation Tool Module (Block S) (HAT)) that open or break the audio and/or video prior to the audio mixer. The control signals that relays receive can be serial/RS232 or USB control data from the Host Automation Tool Module (HAT). Thus, the switching the audio on and off can be done before the mixer.

Block K converts Television Video output of Block C, the video mixer into video that can be processed by a computer. In some embodiments this function is included in the Call Computer Block A.

Block L generates and adds text message overlays to the video from Block K to be returned to all Video Call CPUs and hence as return-video to the caller. In some embodiments, a process for the video return to the caller can include converting the television video to analog, inserting the text, and converting the combined image to computer video for return transmission to the callers. In some embodiments this is done upon a Serial Digital stream. In other embodiments the function is combined into the call computer block A.

Block P is the Producer Control Point which includes the ability to monitor and control video calls on the Video Call CPUs either directly, or via an optional control CPU, including the entry of Caller Text Overlays and continuous video monitoring of video output (including Caller Text Overlay) from the Video Call CPU or from the Television Video Converter if it is dedicated to each Video Call CPU. Incoming audio is monitored and return audio can be interrupted by the producer to communicate with each caller. The Producer PC may also have a converter B and feed the switcher C to permit last minute website to be selected on air by the host working with the Producer.

Figure 7:
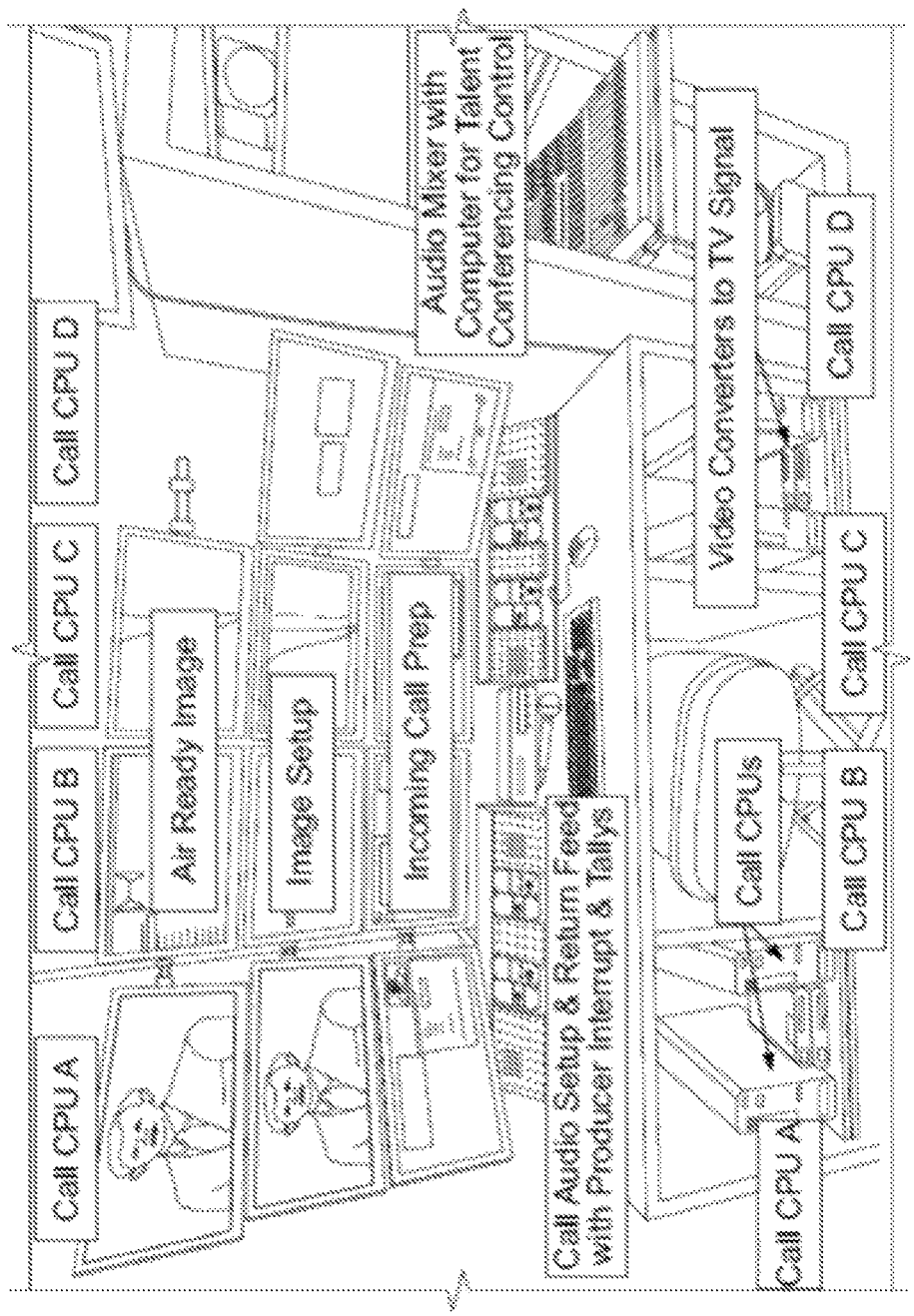
FIG. 7 is a figure depicting a video call center system.

An embodiment of an installed video call center system is shown in FIG. 7.

As shown in FIG. 6, when on the air, the TV Video Call System is intended to be operated by two people: a producer and the on-camera talent, with additional producers as necessitated by caller load or program complexity. The producer at Block P, the Producer Control Point (shown in FIG. 9), screens incoming calls, decides on and enters the Caller Text Overlay (Bill, Chicago), and enters topics and other notes for the talent to see on the display shown in Block H. Incoming audio from computer can be amplified. Producer uses "monitor" side of a switch to listen to caller when establishing call & text overlay. The producer can switch to "Air" when ready. In some embodiments, the hardware switch may be replaced by a software "GO" switch within the Call CPU which messages the Host Automation Module (S) that a call has been "cleared", the Host Automation Module then closing the appropriate audio and video relays to make the call available to the Host and video mixer.

Figure 9:
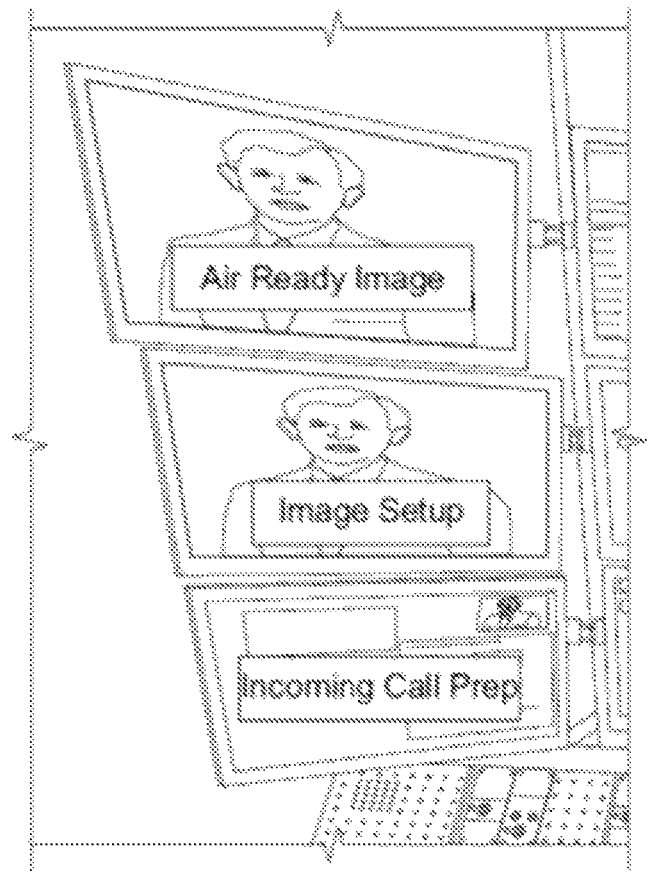
FIG. 9 is a figure depicting a video call center system.

In some embodiments, as shown in FIG. 9, the process can be:

1) when call is received, the producer enters city, subject and caller name in the text entry box. The producer can also include topic, or any other relevant info that fits ("Incoming Call Prep" in FIG. 9).

2) Caller info is immediately displayed in a predetermined position and font (with drop shadow and logo option) on the incoming caller picture ("Image Setup" in FIG. 9).

3) Picture is cropped and converted to Television Video. With Caller Info always part of the picture, any question of which caller is can be eliminated in a fast paced show. Further, supporting staff to assure subsequent accurate entry to talent and text is unnecessary. (FIG. 9 "Air Ready Image")

Figure 8:
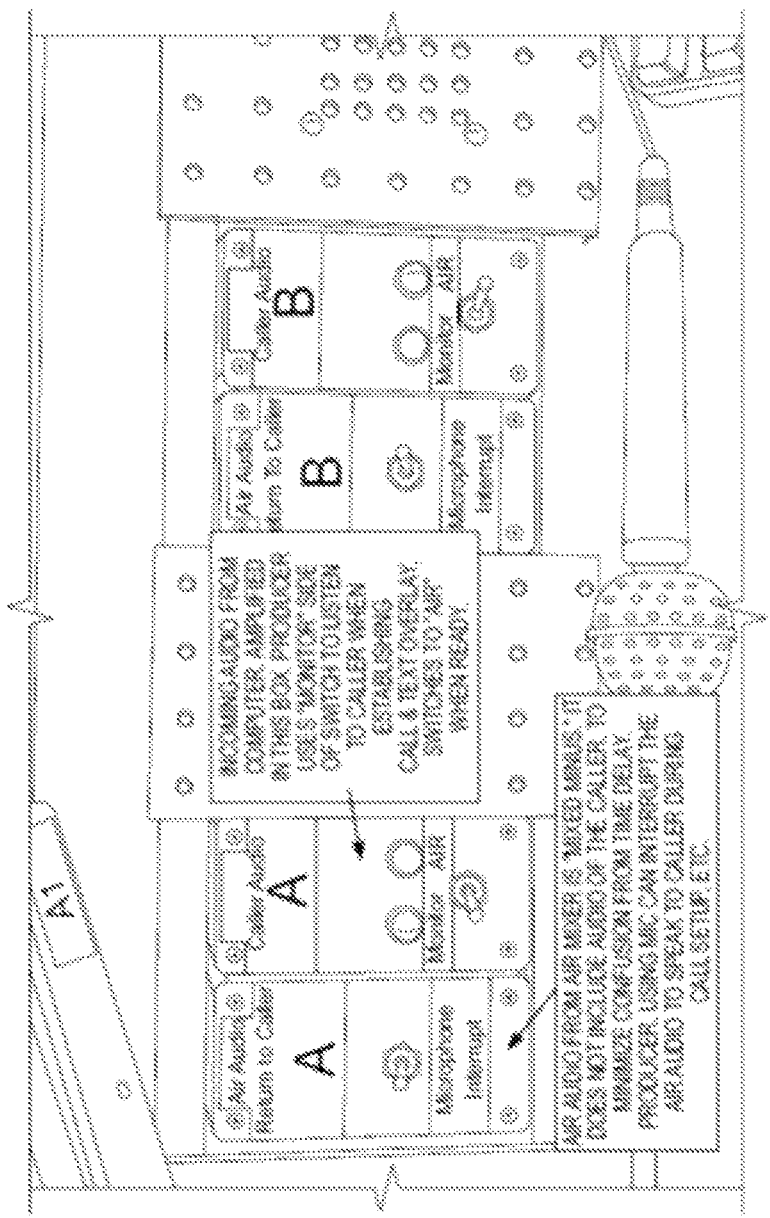
FIG. 8 is a figure depicting a video call center system.
Figure 10:
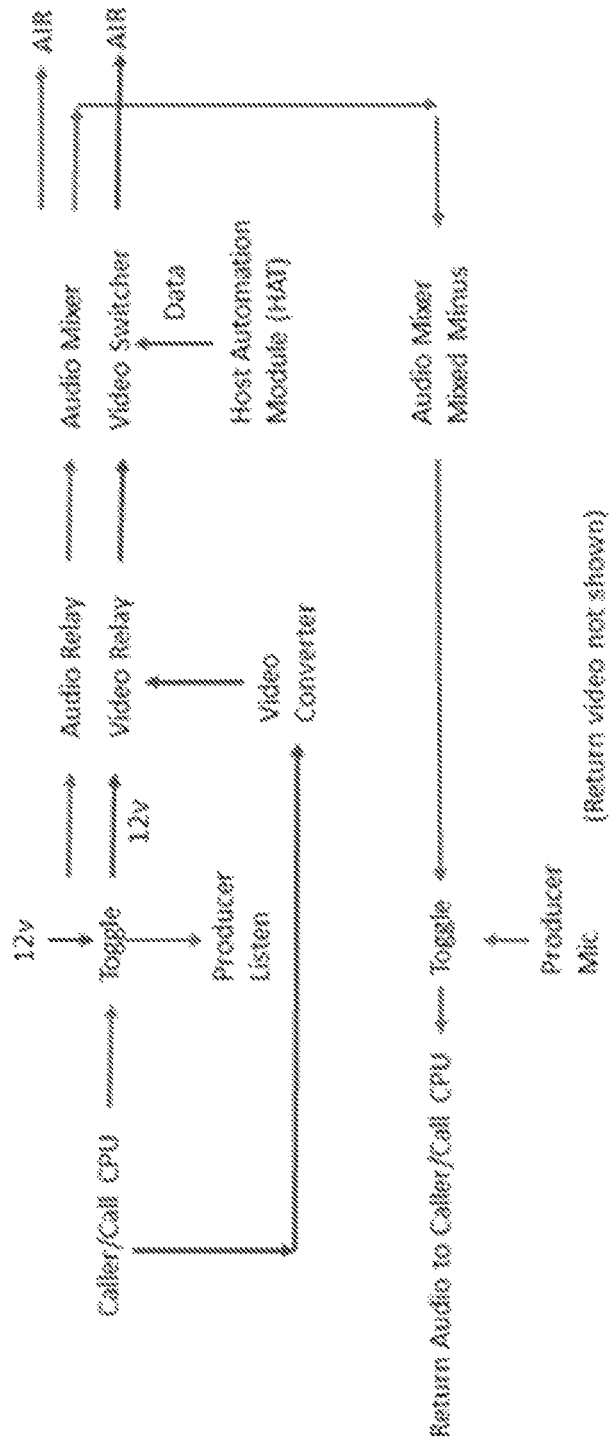
FIG. 10 is a schematic diagram depicting a video call center system.

FIGS. 7-9 reflect a configuration shown in FIG. 10. The incoming video/audio signal is directed to a toggle switch. The audio signal is then directed to audio relay and audio mixer to be aired. FIG. 10 also shows the return audio signal. Likewise, the video signal is directed to audio relay and audio mixer to be aired. Return video signal is directed by the system to call CPU as well (not shown in FIG. 10).

Figure 16:
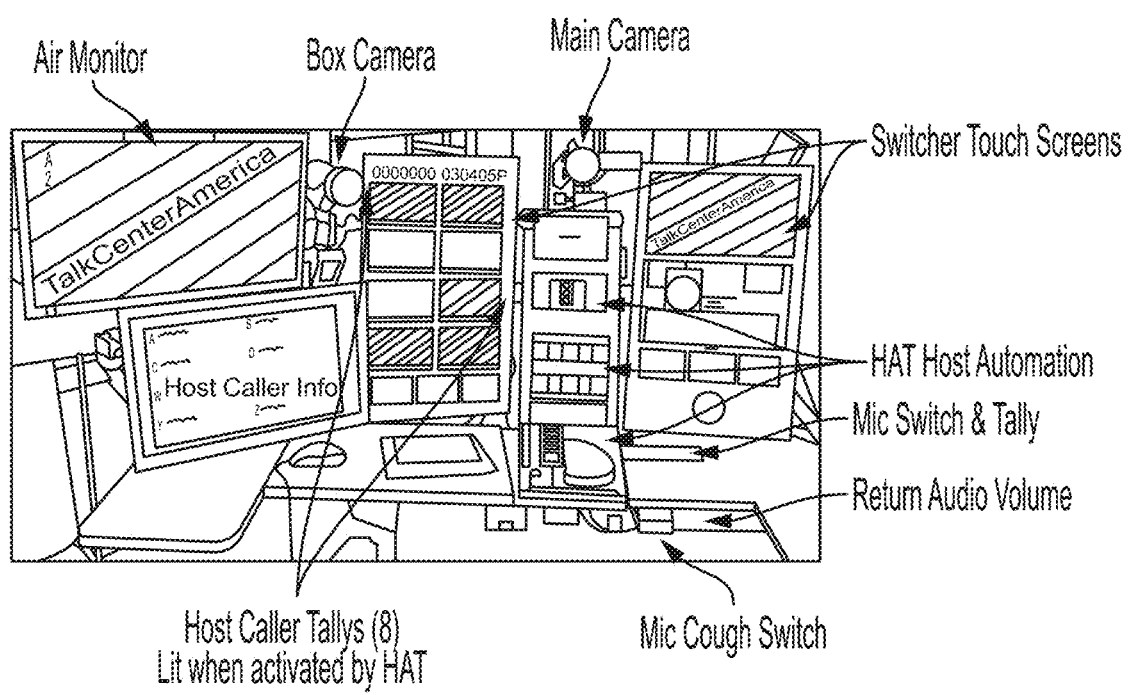
FIG. 16 is a figure depicting a video call center system.
Figure 17:
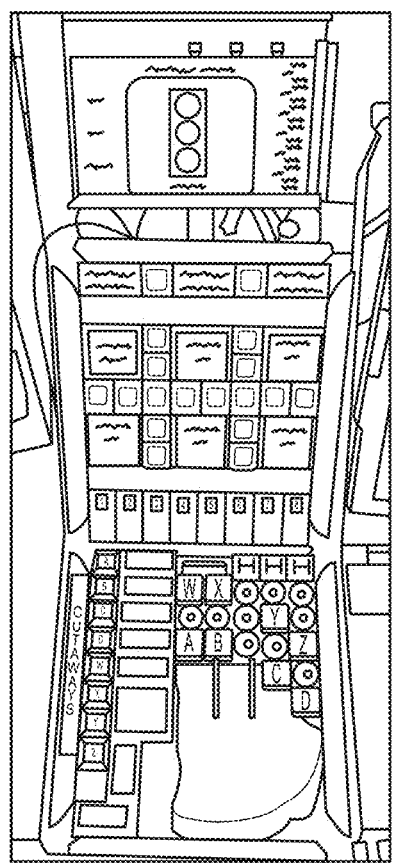
FIG. 17 is a figure depicting a video call center system.

As shown in FIG. 16, the on-air talent sees the pictures of available callers and Video Caller Text Overlay on his/her touch screen, and selects the next desired video caller for air by tapping the picture of the desired caller. That caller is now on the air. By selecting video and/or audio from additional callers through Block J, the specialized audio conference mixer-controller, the on-air talent can allow multiple separate callers to participate in a conversation on air, while the on-air talent independently selects from the multiplicity of video pictures of the participating callers. The on-air talent neutralizes the conference when ready to move on to the next video caller. In addition to selection pictures via the touch screen, the talent selection of video pictures can be partially automated through a combination of audio-follow video and voice activated switching methods as allowed by the relays within Block E.

When a video call is received at the Video Call CPU, the Producer in contact with the caller, enters text for the Caller Text Overlay in one part of the screen, such text displaying in a predetermined position over the video caller in the video caller part of the screen(s) of the Video Call CPU. Such text may be entered in an on-screen box specifically designed for the purpose, or entered into a data-base form. In either case, the text appears both in the box/form as it is entered, and over the video of the caller. Caller ID information is extracted from the available call data and is shown on the Producer's control screen as a cell in a database window. Additional pertinent information regarding the caller, legal releases, may be entered by the Producer into a data base form. Topic information and notes for the on-air talent are also entered into the data base form, but such information for the talent is immediately transmitted to the talent's information screen, (H). Caller ID information automatically activates a search of the central data base (G), and any information located is returned to the data base form at the Video Call CPU for use by the Producer in the call screening process. New information entered into the database form at the Video Call CPU is saved into the central database when the call is terminated. Additional pertinent program details such as date, time of air, show name, talent, producer are entered at login and retained within each database entry.

The Video Call Text Overlay eliminates the need for a traditional character generator operator and associated production assistants, while assuring that there is no mix-up in who is calling during a fast paced show. Traditionally, television text is inserted during or after the switching process of the television-type video, which requires coordination between the incoming call and the name attached to the call. In the current embodiment, the text is inserted within the computer handing the incoming call and before the computer video is converted to television video. This assures that the text stays with the caller's picture throughout the process.

The use of the touch-screen caller selection by the on-air talent eliminates the need for a technical director who normally switches pictures of talent in remote video, while letting the on-air talent control the content flow of the program through video touch screen and through the customized audio conferencing unit.

The conference mixer-controller (Block J in FIG. 6) can be ergonomically designed. It can allow the on-air talent to control on-off video and/or audio for each caller without looking down from camera, while reducing potential for hitting the wrong button.

Figure 11:
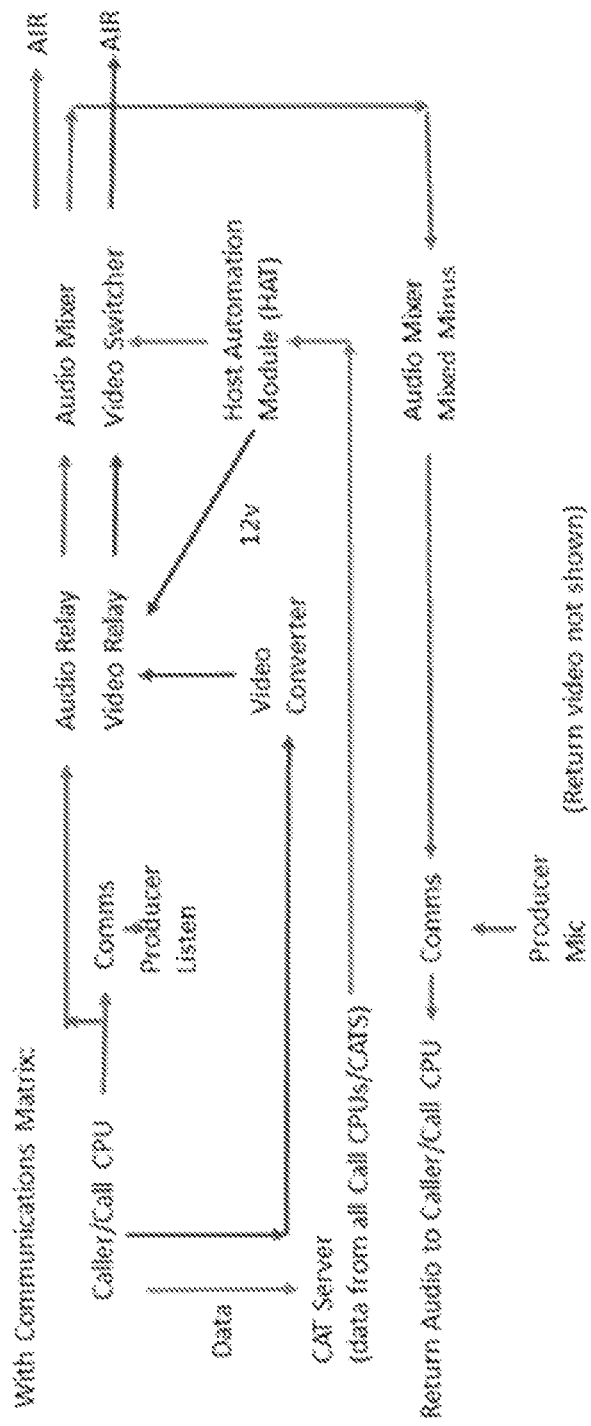
FIG. 11 is a schematic diagram depicting a video call center system

In some embodiments, the producer-caller communication may be via a communications matrix as shown in FIG. 11. Caller Acquisition Tool (CAT) is included to streamline the process of logging and retrieving caller data and presenting it to the call screeners, production staff. Toggle switches can be replaced by a professional communications matrix (ClearCom or Comms in FIG. 11) and soft-keys on the CAT running on the Call CPUs, via a server. The call producer can clear a call by clicking GO on the CAT screen, which will send a serial message to the HAT via the CAT server. The HAT will send a message to close the appropriate video relay, making the call available to the host and switcher. Currently the relay is closed when the producer switches the toggle to air (also see FIGS. 18-27). Likewise, the audio signal is also directed to audio relay and audio mixer to be aired. FIG. 11 also shows the return audio signal. Return video signal is directed by the system to call CPU as well (not shown in FIG. 11).

Figure 12:
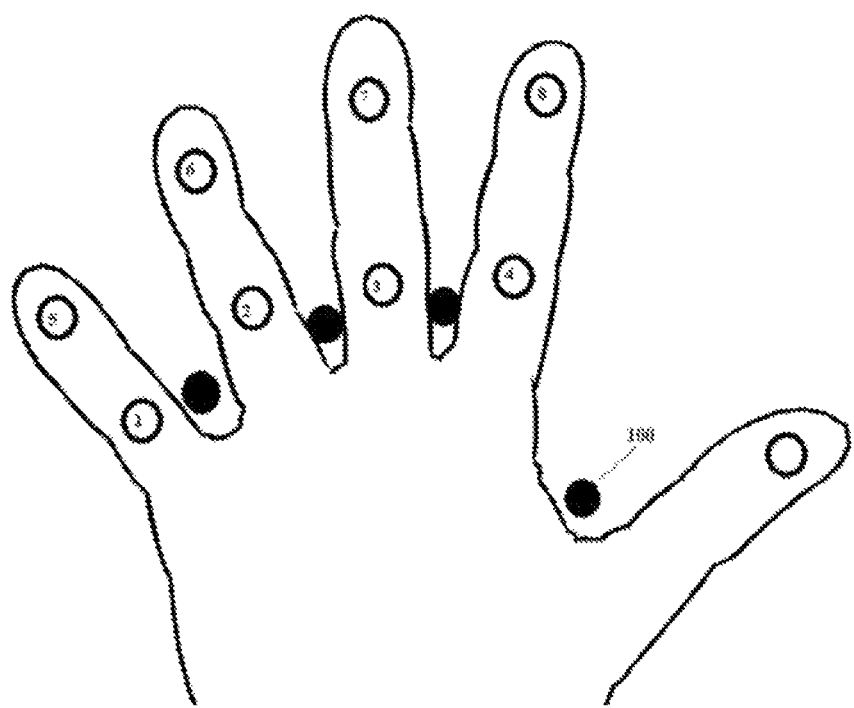
FIG. 12 is a schematic diagram depicting a video call center system.

As shown in FIG. 12, keys/buttons can be custom positioned on a commercially available flexible input system that has been modified for comfortable hand position to create an ergonomically designed conference controller pad. It can contain a series of switches or switch controls arranged under the fingers of either or both hands, so as the pressing of several selected switches will result in the video and/or audio associated with those switches being placed on air individually or in conference. It can have pins 100 between each finger so that the ergonomic design of the switching unit can prevent errors when then hand is placed into the unit while the on-air talent is on air. In other embodiments, as shown in FIG. 11, bridge 200 and/or raised bumps between active keys can be used as a replacement of pins to provide a tactile warning to assure accurate position of index and middle fingers.

Secondary hardware or software latches and releases via foot pedals and/or under the thumb (shown in FIG. 14) can used to insure that the intended video and/or audio switches being added without error, and permit clearing of all non-desired video and/or audio. As further shown in FIGS. 12-14, a partial sphere shape (300 in FIG. 13) and a molded negative palm cast (400 in FIG. 14) can be used, separately or in combination to support and assure proper placement of the hand.

Figure 13:
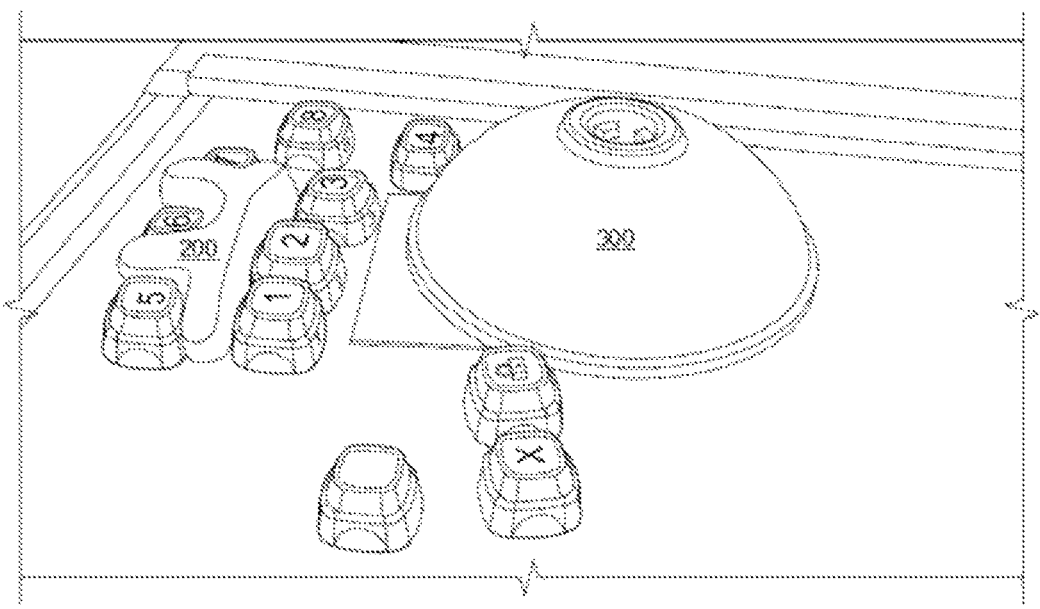
FIG. 13 is a figure depicting a video call center system.
Figure 14:
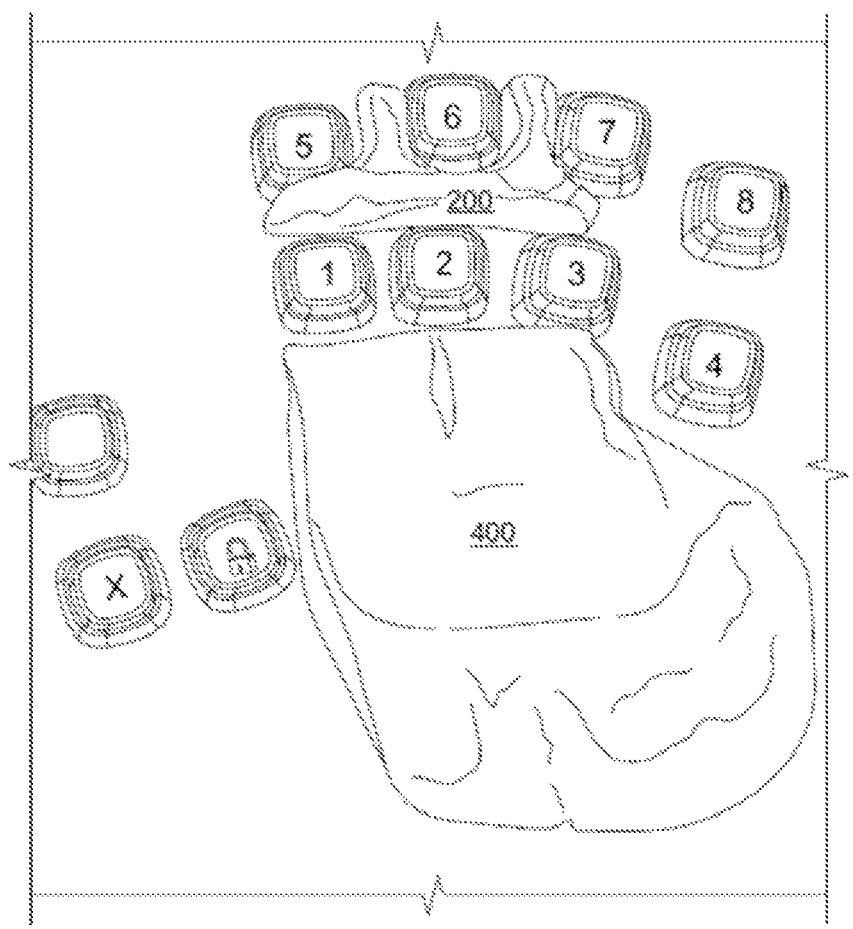
FIG. 14 is a figure depicting a video call center system.
Figure 15:
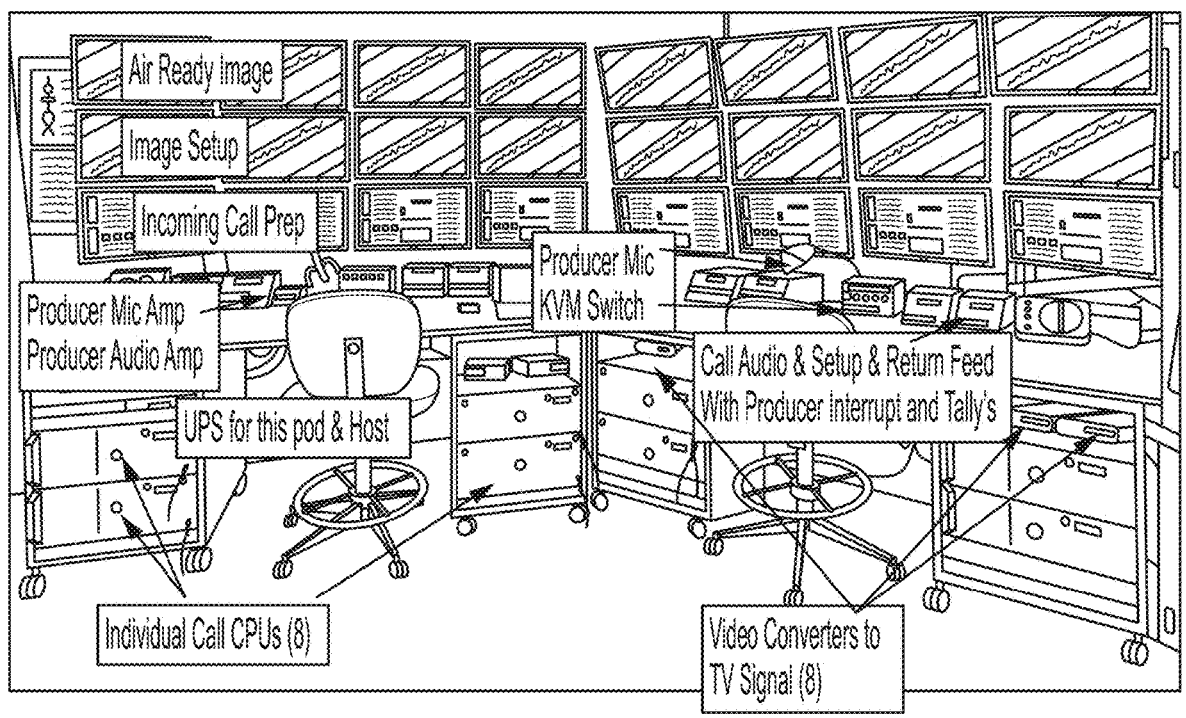
FIG. 15 is a figure depicting a video call center system.

In some embodiments, the conference controller pad can handle a selection of individual inbound callers, such as caller A, caller B, caller C, caller D, caller E, caller F, etc. The selection can include any inbound caller and the number of selected callers can be one, two, three or any number the on-air talent wants. In some embodiments, the conference controller pad and associated software can be modified to let the on-air talent put two or more callers on the air at the same time. In some embodiments, the conference controller pad and associated software can enable the on-air talent put multiple callers on the air at the same time, while the rest of selected callers stand by. As shown in FIGS. 13-15, the on-air picture shows the on-air talent plus a primary or featured caller who may stay on through a number of calls, and then a third picture of the current caller, or, in the alternative, just the featured caller and the current caller. This allows the easy incorporation of, for example, a government official or an author as a featured guest calling in, and then lets other callers appear with that featured guest.

The conference controller pad has multiple primary buttons under the palm shape for easy location. As shown in FIGS. 12-14, eight buttons can be labeled A-D and W-Z to control the audio and video from the call CPUs of the same name. The caller can connect from any device with suitable video/audio input and transmission functions, for example, a computer, tablet, smart phone or other mobile device. The button can be in same color, e.g. green. In addition there can be eight other buttons of different color, e.g. yellow, labeled in the same way. When a single primary button is pushed and released, the caller associated with that call computer is sent to air. In order to put two callers up at the same time, the secondary caller (yellow) button is pressed and held down, then the primary caller button (green) is pressed and held down, and when both are released, the combination key selection triggers the appropriate software to open the audio relays and begin the video switching process predetermined for that combination. In some embodiments, once an initial caller sequence is started, the air talent can use a second key which, when held down in conjunction with another caller's key, will add that caller to the airing sequence, or, conversely, subtract a caller from the sequence. When this occurs, the sequence changes (defaults) to the sequence appropriate to the new number of callers In some embodiments, the trigger actually occurs on the release of the key/button. This allows the on-air talent, during a live show, to prepare to take the next caller by putting his/her fingers on the appropriate keys, and then waiting for the right moment to cause the next event to occur. There can be at least one additional button/key. It can stop the caller's audio and video and immediately returns the video signal to the host. This button/key can be used to end calls.

The TV Video Call System requires a multiplicity of callers connected to a multiplicity of call CPUs or virtual equivalent. As the result, the system receives a multiplicity of separate audio and video signals from those caller devices through the call CPUs. Since the broader process separates the audio from the video for processing, call selection and switching/mixing, the use of this multiplicity of nearly identical inbound signals through a multiplicity of nearly identical caller CPUs or virtual machine equivalent makes the identification of any individual inbound audio signal difficult during the system setup, testing, and management phases of operations. Traditionally, a standard 1000 Hz tone has been used to identify and adjust the audio portion of a television signal. However, in this case, the multiplicity of similar signals can all carry the same 1000 Hz tones, resulting in confusion and delay in identifying the signals. Therefore, it can be particularly difficult to build and test a composite end audio/video product composed of two or more incoming signals because the sameness of tone makes it impossible to distinguish two actually different audio signals.

The solution is to provide a tone of a different frequency for identification of each call CPU, thus allowing creation of an easily distinguishable chord when the signals are combined or a differentiated tone when a single signal is being identified. Such differing tones can be generated in real time within the call CPU, generated through playback from a previously recorded file stored within the call CPU, generated through a signal generated in a test computer that is originating (sending) a call received by a call CPU, or generated by playback of a downloaded application within a test or consumer computer that is making the inbound call.

Additionally, tones of a certain nature can be used to identify a specific group or bank of call CPUs. In some embodiments, groups of four computers can be clustered together under the control of one call producer/screener. All tones of one group of four call computers are of frequencies normally associated with the "white keys" on a piano—for example, A, C, E, G, while as second "bank" of call computers is identified by "black key" frequencies, A#, C#, F#, G#. This results in an immediate audio dissonance should the banks be combined when testing require they be kept separate.

As shown in FIG. 15, the TV Video Call System can have multiple screens for displaying the air ready image, image setup and incoming call preparation.

FIG. 16 shows the control and display setup for the air talent. On the right side, the Host Automation Tool (HAT) is positioned adjacent to the ergonomically designed conference controller. FIG. 15 shows the status screen, content control pad, and ergonomically designed conference controller (from top to bottom).

In some embodiments, Caller Acquisition Tool (CAT) is designed to streamline the process of logging and retrieving caller data and presenting it to the call screeners, production staff. The CAT can also parse and overlay key information about the caller into the video stream, which is carried to both the host's workstation and the outbound video. Additionally, CAT allows for single-click management of a variety of common troubleshooting and initialization steps developed over the last year of development and testing. While the software titled CAT performs the majority of these functions, the actual CAT solution is a combination of hardware and software.

In some embodiments, custom-built Windows 7 Professional desktop Video Call CPU computer(alternatively referred to as the CAT computers) are connected via workgroup sharing to an Advantech Windows 7 computer (the Server) running Access Database connectivity software and hosting the caller database, CAT software, AutoHotKey automation scripts, batch files, and a variety of installation utilities in the event that CAT units need to be reimaged or otherwise reconfigured.

The CAT computers and Server can be networked in a certain IP address range, which adds a layer of separation between them and other networked devices within the studio. Additionally, they are configured with the same workgroup.

By way of example only, and not by way of limitation, on first startup of the CAT computers, a batch file runs to ensure connectivity to the Server, and maps two network drives which reside on the Server. The first drive contains all software related to CAT functionality within its various subfolders. The other drive is called the "Air Pics" folder. This folder can be utilized by a producer to preload graphics for use during a show.

In some embodiments, in the event CAT computers are unable to access the server or mapped drives and the issue is determined to be outside of that specific unit, an administrator can log in to the Server via direct access and run a batch file solution to reset workgroup sharing on the server.

When the CAT software opens, two positioning scripts are run to ensure the main CAT screen, the Text Overlay, a Video-over-IP (VoIP) application (e.g. Skype®) and it's video preview are positioned properly, in addition to a third-party audio monitoring program. After initialization is complete, the user must select the show format from a dropdown list (which retrieves show metadata set at the Producer level such as show topic, host name, and date, in addition to some formatting configurations for the font face, color, and size the Text Overlay will use) and enter their name and lock this data to continue. Only after this is done will the Caller Information panel become available so calls can be logged. If there is a changing of the guard or a different show format is coming on, the user can unlock this data, update their selected show, and re-lock. The show metadata and screener name are automatically logged alongside caller data.

In some embodiments, the CAT software can pull the scheduled caller list based on the selected show metadata and not list callers who have been established for other shows or formats.

The process of logging a call can be divided into four steps, performed sequentially for the most part:

* READY—Clears out any entered data. It can restore the Text Overlay to the HOME position (top left). When in the READY state, the caller information panel is GREEN. Once READY has been selected, scheduled callers can be selected from a dropdown list or searched for via Skype® or other application, account name or email address. Either of those options will fill in whatever information we have previously logged about the caller aside from the topic they are discussing, speeding up the process significantly. These options are mutually exclusive: Selecting a caller from the scheduled list prevents searching via account data, and vice-versa. This is primarily to avoid database connectivity hang-ups.

* SET—Checks to ensure all required data fields are filled in, and presents a specified error if any are not. If all required conditions are met, the caller data is logged to the database along with the show metadata and current time. The Text Overlay is updated with the caller's name (which can be abbreviated via a checkbox) and Location or Topic (selected via a radio button next to either field). At this point the host's terminal will still show "NO CALLER" on the line pertaining to the CAT computer in use, as all screening and readiness requirements may not have been confirmed yet. In this state, the Caller Information panel turns YELLOW.

* EDIT—Hides the Text Overlay temporarily and allows the user to make alterations to caller data, updates the entry in the database and restores the Text Overlay. Caller Information panel turns ORANGE in this state.

GO/STOP—Multiple functions:

—GO: Updates the database entry for the current caller and flags them as Air Ready. Additionally starts a stopwatch which calculates the age of the call and updates the database every 5 minutes. When set as Air Ready, the caller is listed on the host's terminal, displaying their Name, Location, and Topic. Based on call age (or two importance flags set at the Producer level), certain color coding options are set at the host terminal level so the show talent knows who is a priority and who has been waiting longest to talk. Call screeners are still able to EDIT at this point. The Caller Information panel is RED at this point. In one embodiment, the GO command is communicated to the audio control/host automation control computer which uses such information to determine whether a call has been cleared for air prior to allowing it to be switched onto the air.

—STOP: Indicates the caller is done. At this stage, the current time is logged as the End Call entry in the database, and the Air Ready flag is removed. An optional caller notes field is available; these notes will be presented to a call screener the next time they search for a caller's Skype® account or email address, to ensure no abusive callers are allowed to return on air. Once notes are entered or skipped, the Caller Information panel returns to its default color.

In some embodiments, there can be an Active Caller list which displays all the same information as the host's terminal. In particular if the Producer has set a caller as the Next Caller, their name will be highlighted in BLUE. An attentive screener will be able to inform that specific caller to prepare!

By clicking any of the six Text Overlay positioning buttons (Top Left being marked "HOME"), the caller's Name and Location or Topic can be displayed over their Skype® image in a variety of positions.

* The vertical position of the Text Overlay is adjusted via calling either OVERLAYT.EXE (top) or OVERLAYB.EXE (bottom). Pressing the button marked "TEXT TO HOME" restores the overlay to the Top Left position.

* The horizontal orientation is then altered by modifying the graphical text on the Text Overlay to Left Align, Center, or Right Align.

* The text can also be hidden (which is done by default when editing a caller's data), useful for when a CAT computer is being used for media instead of a caller.

* Fine-tuning the Text Overlay positioning can be achieved by pressing the "UNLOCK TEXT" button, which makes four white dots visible around the border of the Window, allowing the user to drag the window wherever they like. If "LOCK TEXT" is pressed, it will hide those dots and prevent the user from moving the text accidentally.

Functions designed to speed up troubleshooting, quick-fixes to common problems encountered over the last year of development, or unit isolation if required.

* Reset Video Converting Application: Kills and restores Video Converting software to its default screen size and position.

* Reset Skype® (or an alternative Video/Voice over IP service): Properly shuts down Skype® if possible, then runs a taskkill command on it if not, then restores the program before calling the proper positioning script.

* Reset Audio Meter: Kills and restores the audio level meter program before calling the proper positioning script.

* Turn Skype® Off/On: Runs a batch file which modifies Windows Firewall entries as they pertain to Skype® and disables or enables the program's ability to connect depending on selection. This is typically used for isolating units during pre-show test phases.

* Turn Internet Off/On: Runs a batch file which modifies Windows Firewall entries as they pertain to all internet connectivity aside from TeamViewer remote access software, depending on selection. Additionally, this does the same for Skype® as an added level of isolation. This is typically used in the event a CAT computer is having unresolvable issues and would make it less frustrating for callers to be picked up on a defective screener unit.

* Turn Audio ID Off/On: Depending on selection, plays or stops a WAV file with the specific CAT computer ID. This button flashes red and pink when the audio file is running, to alert the user in the event they cannot hear it happening.

In some embodiments, on the producer's workstation, there is a program which:

\* Lists all active callers and allows the user to set or clear priority flags beyond the call age, to indicate visually to the host which caller is the next in sequence or is important.

\* Allows the Producer to send a short text message to a small screen at the host position, to inform of important actions to.

Configure show metadata for topics or formats, and globally establish font face, size, and color for the CAT computer Text Overlay.

\* Enter data pertaining to scheduled callers for specific shows or formats.

\* Clear all Air Ready flags to give the host a clean slate. Note that this does not STOP a call on any of the CAT computers.

At the air talent's terminal there may be one or more screens to assist in communications with the producer(s). In one embodiment, two screens can be used to provide detailed information on callers and important messages to the host. Such screens may be directly connected to a server, or via one or more separate CPUs via LAN.

\* On the large screen, Host Viewer should be displayed, which is the grid-based list of all available callers, their locations and topics, presented according to a color-coded scheme set by call age or Producer-level priority flags.

\* On the small screen, Emergency Messenger should be displayed, which shows the 70-character text message from the Producer mentioned above.

FIGS. 18-27 show one embodiment of the CAT screen and control setup.

Figure 18:
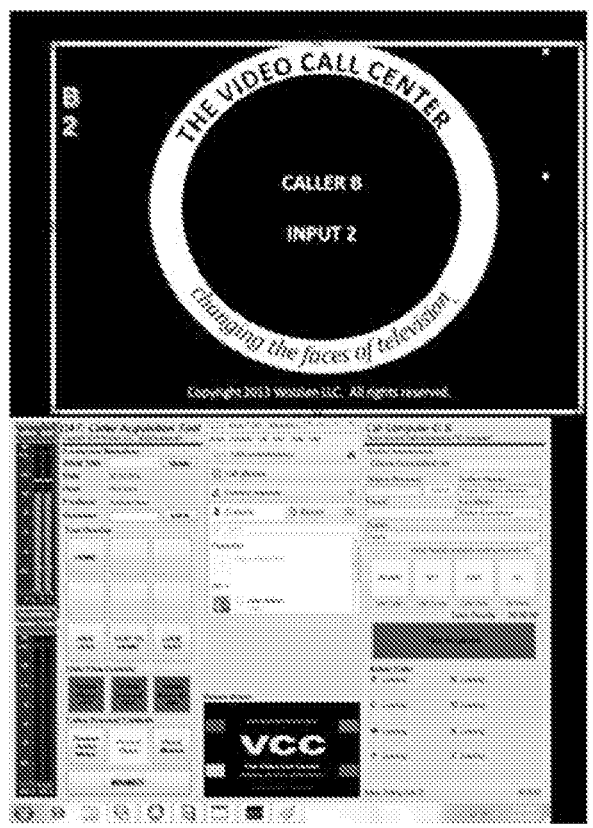
FIG. 18 is a figure depicting a video call center system.

In FIG. 18, the producer works with two screens for each caller. The top screen is to position the text overlay with caller info and for video setup, when needed. The bottom screen is for preparation of the metadata and monitoring of the audio and video returning to the caller. In some embodiments, there can be a third screen to check the cropped video picture going to the Host and video switcher.

Figure 19:
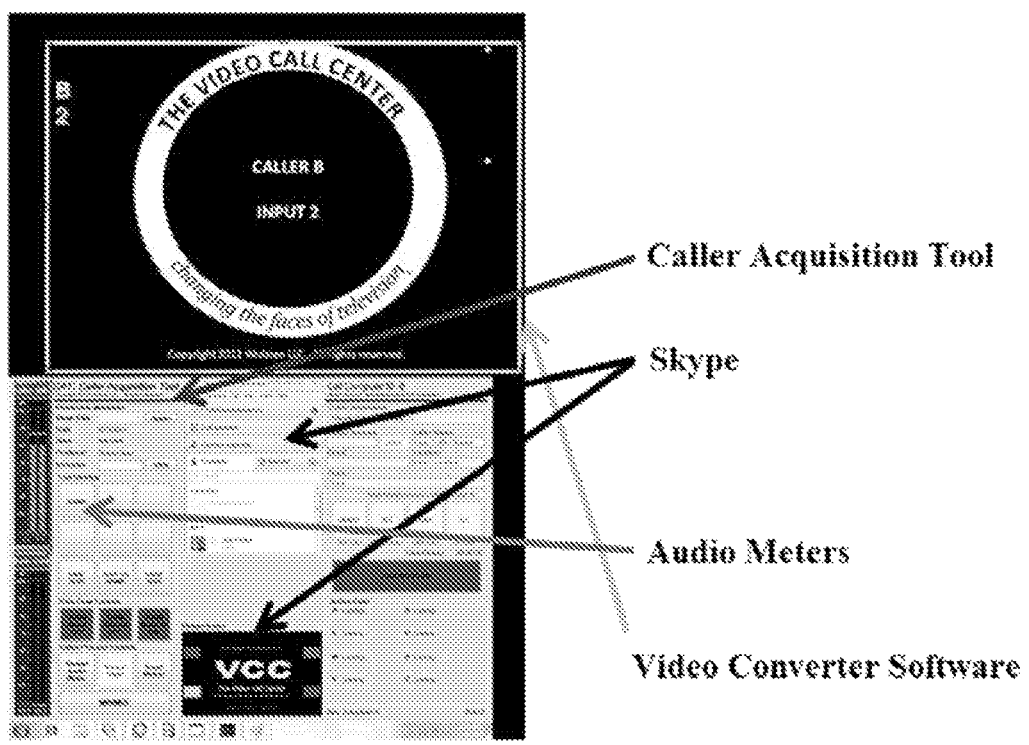
FIG. 19 is a figure depicting a video call center system.

In FIG. 19, there are several different software programs that the Call Screener uses to acquire the call and prepare it for air. Some programs are active and need to be adjusted for each call, others are running in background but may need to be adjusted.

Caller Acquisition Tool is the overlay that provides a user environment where caller data is entered, the text overlay is set, and there are various controls for other callers.

VoIP application (e.g. Skype®) is used for IP Video. There are three Skype® windows: the call control where calls can be made and prior callers tracked, the Return Video window where the video that is going back to the caller can be viewed, and the actual caller window (now shown here) which is placed on the upper screen.

Audio Meters graphically show the caller's audio (bottom) and the return audio (top). Video converter software is running in background, and allows a graphical box on the image preparation screen to be adjusted to crop caller video pictures when, for example, a smartphone picture may be vertical but airs within the normal horizontal television format.

Figure 20:
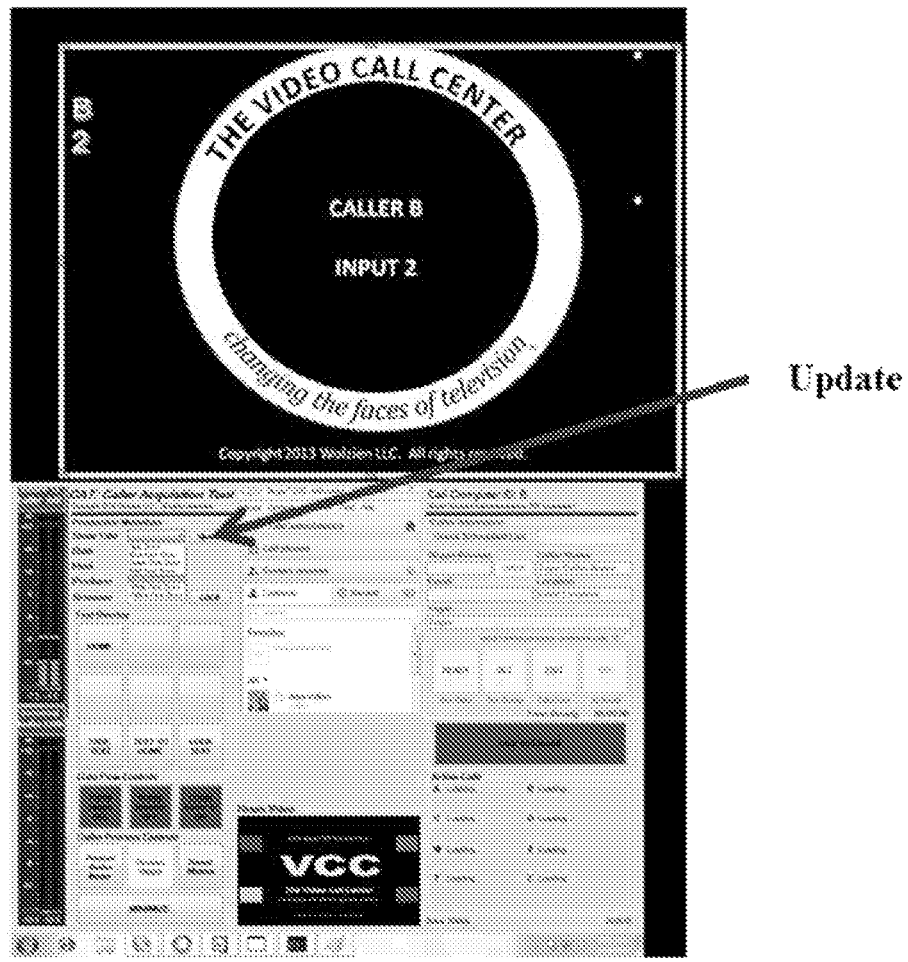
FIG. 20 is a figure depicting a video call center system.
Figure 21:
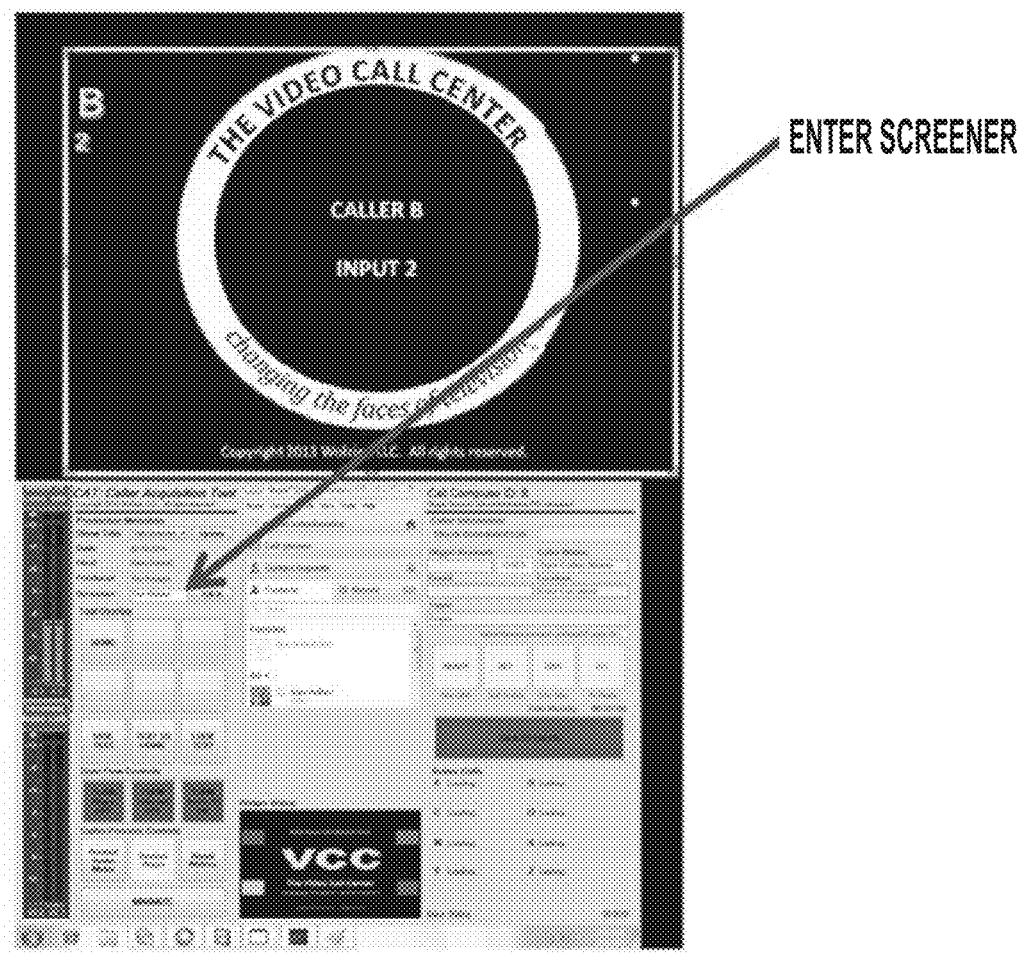
FIG. 21 is a figure depicting a video call center system.
Figure 22:
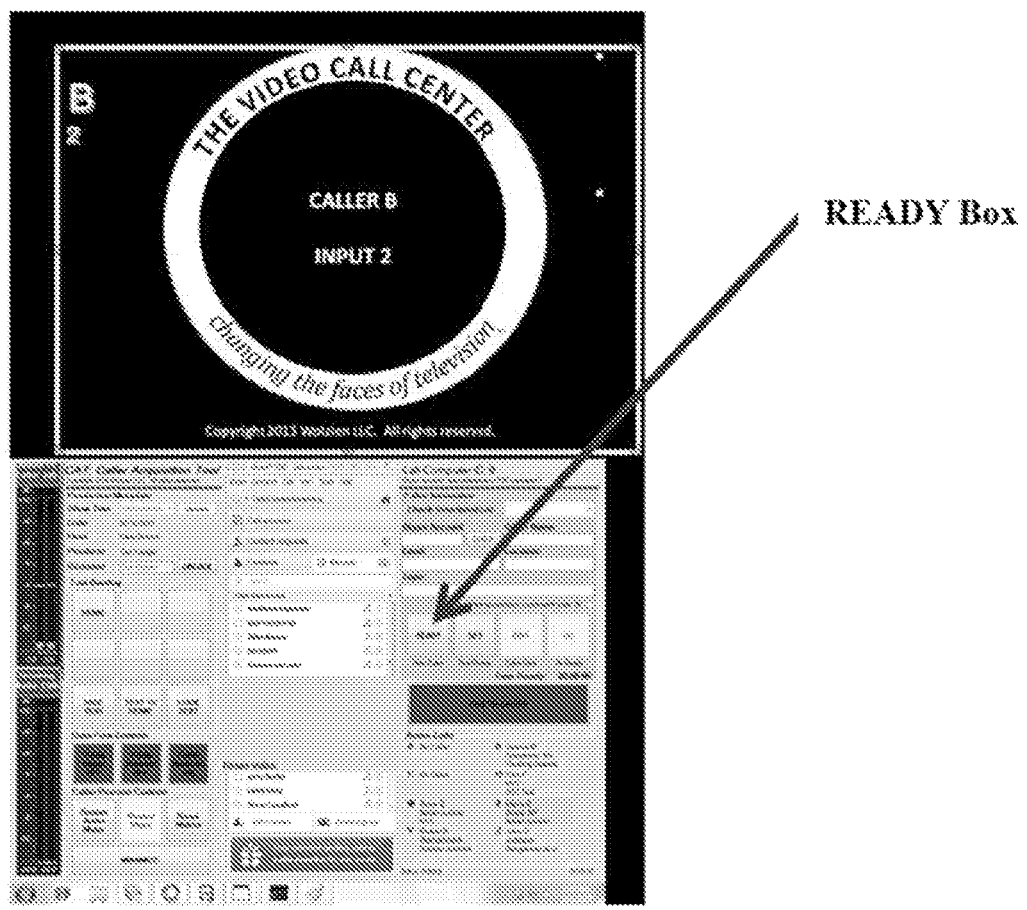
FIG. 22 is a figure depicting a video call center system.
Figure 23:
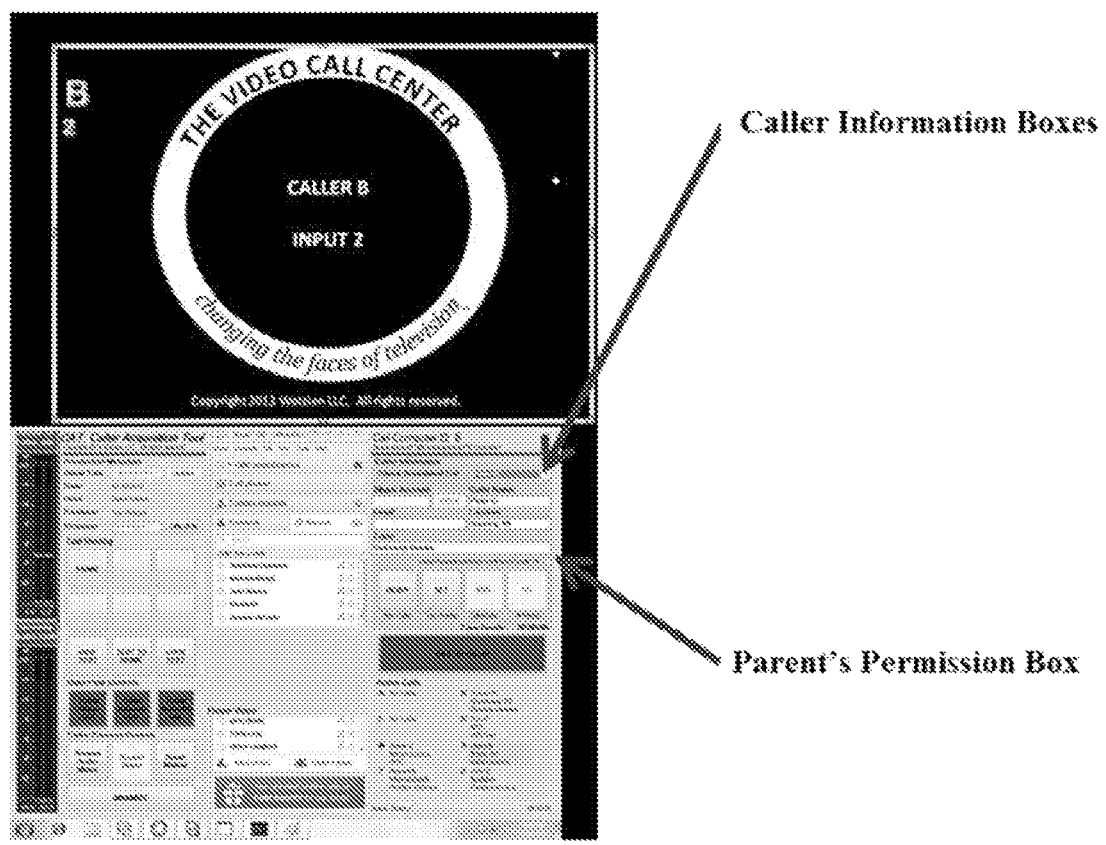
FIG. 23 is a figure depicting a video call center system.
Figure 24:
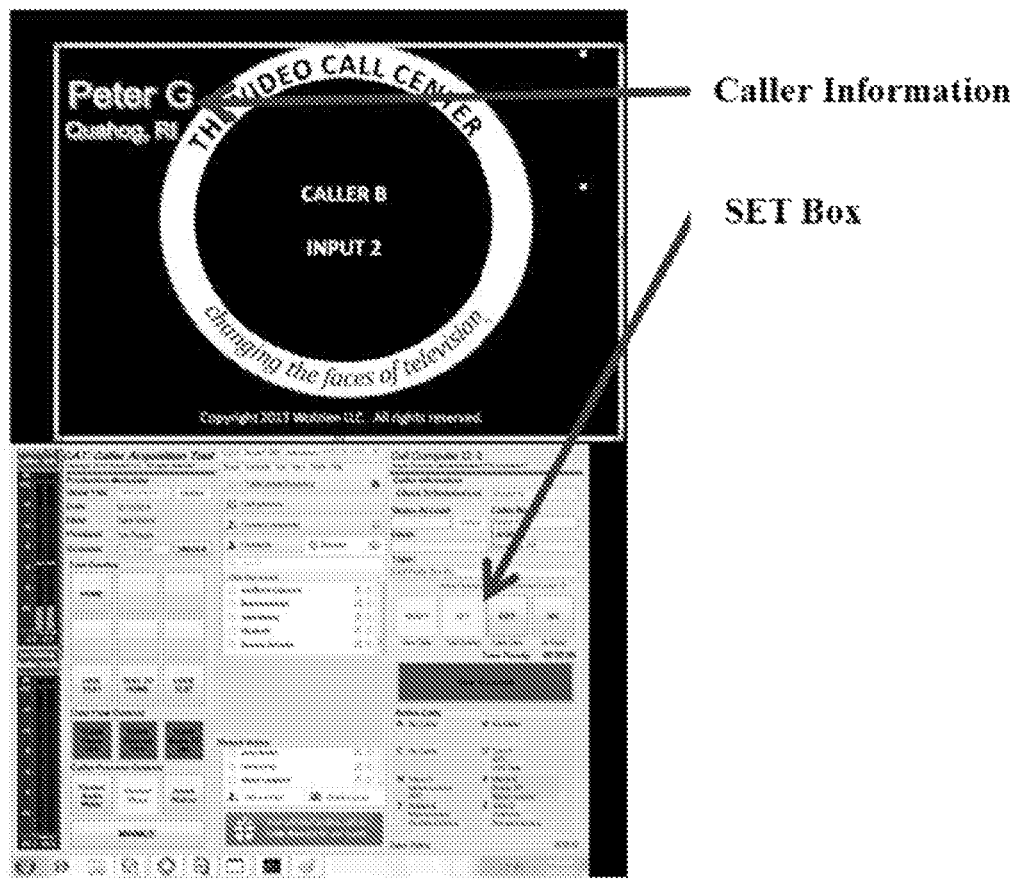
FIG. 24 is a figure depicting a video call center system.
Figure 25:
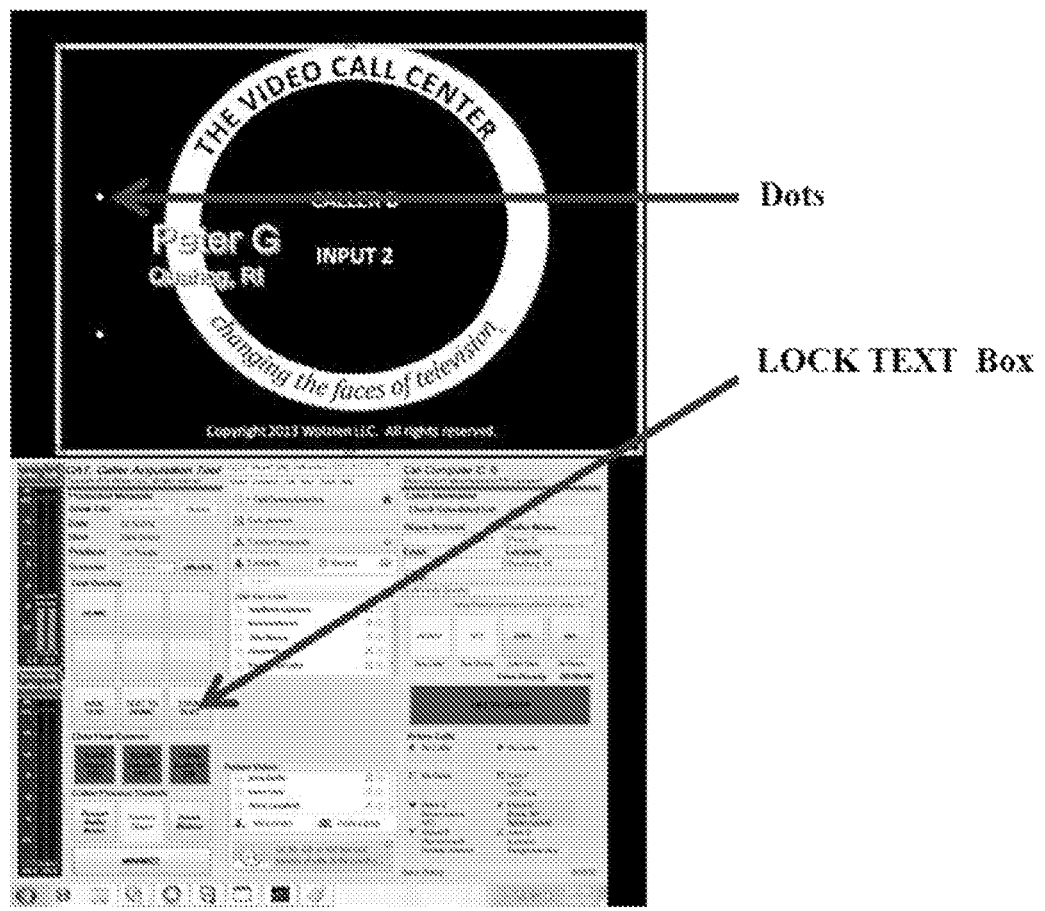
FIG. 25 is a figure depicting a video call center system.
Figure 26:
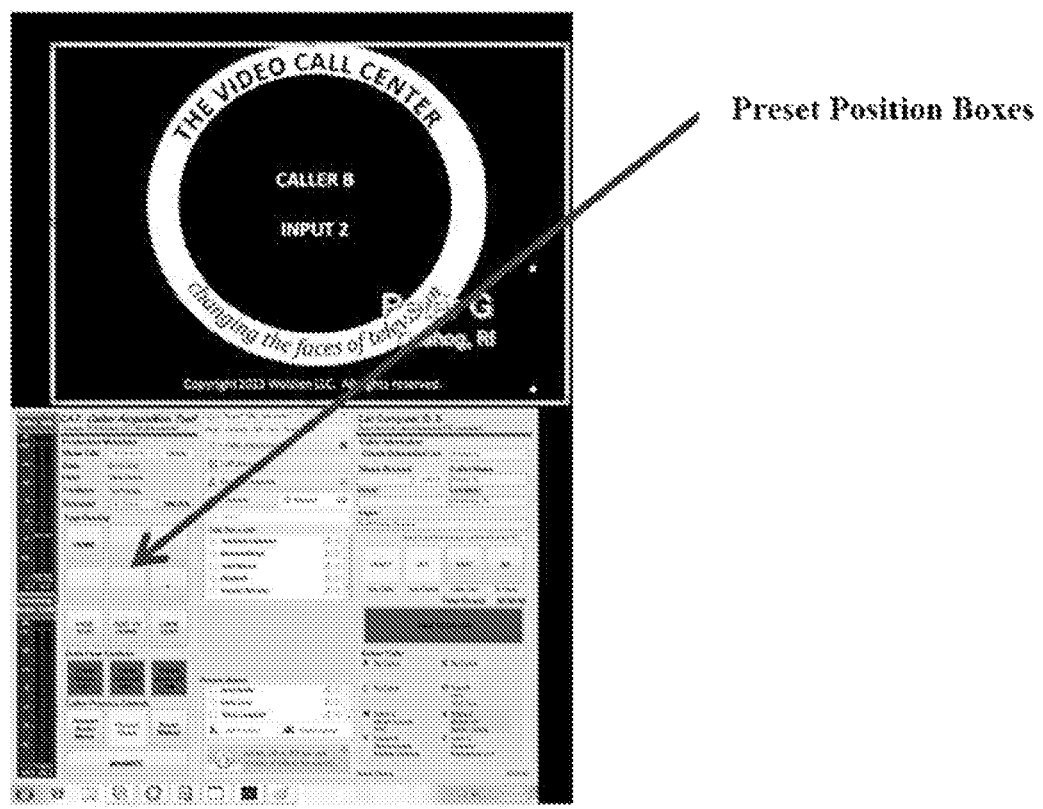
FIG. 26 is a figure depicting a video call center system.
Figure 27:
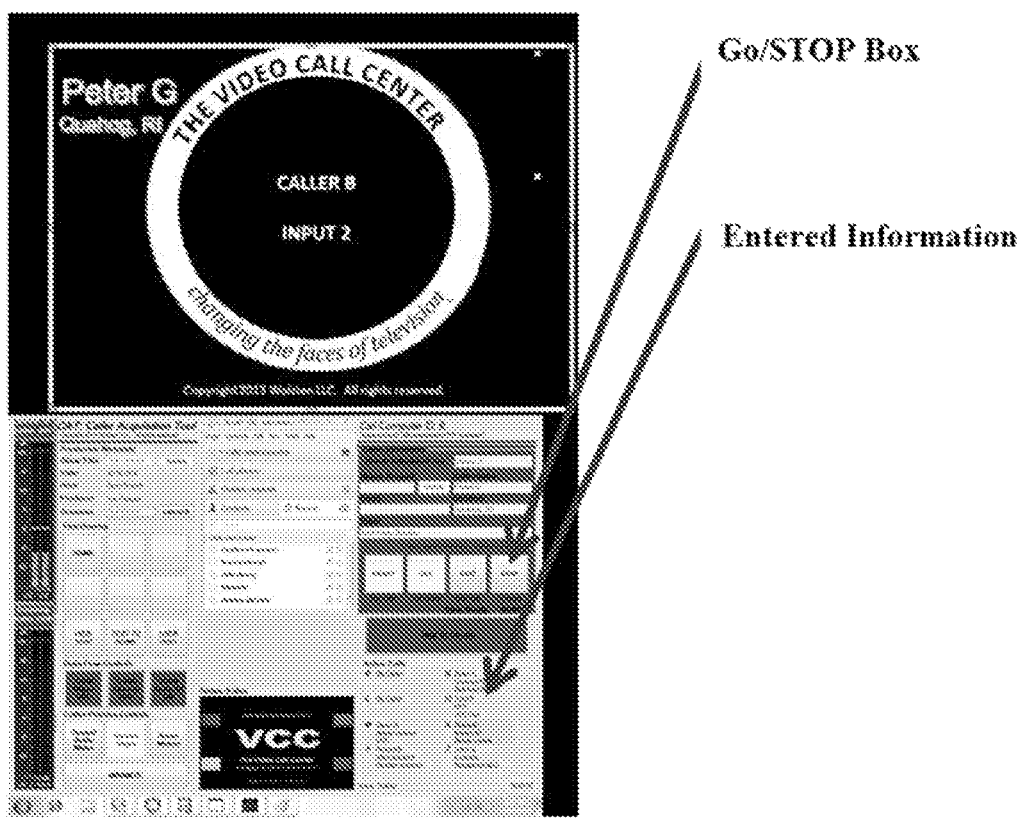
FIG. 27 is a figure depicting a video call center system.

Caller Acquisition Tool (CAT) can be set up for the Show and the Call Screener. To set the show, click UPDATE in the upper left, and then select the show from the drop down bar (FIG. 20). The information of the producer can be entered (FIG. 21). After that, it is ready to set up the first caller. To do this, click on the READY Box on the left center. This will alert the system that the producer will be entering caller data (FIG. 22). There can be two ways to enter caller information. First, caller info can have been previously entered by a producer, and can be accessed by selecting the caller's name from a drop down list of all the callers pre-entered. Or, each caller's name can be entered individually for those is not on a per-entered list. The Caller Name, Location, and Topic for the system need to be entered to move to the next step. Getting the Skype® (or other) IP address and email will be helpful for further contact. In some embodiments, it can include a policy that kids below 18 cannot be put in without parent's permission. In this case, the producer must see the parent on camera giving permission, and put a check in the box when the kid gets the permission (FIG. 23). Once the data is entered, the producer can click on the SET button, and the text will be displayed over the caller picture on the upper screen (FIG. 24). There can be several ways to adjust the text if the position needs to be changed. Text can be freely moved by putting the mouse on the little white dots near the text, and sliding the text around the screen. The little dots can be seen and moved when the text is UNLOCKED. When it is locked, the text does not move and the little dots cannot be seen (FIG. 25). In some embodiments, the text can also be located into one of six preset positions by clicking the position buttons. Positions are Upper Left (HOME), Upper Center, Upper Right, Lower Right, Lower Center, and Lower Left. The HOME button will always bring the text back to the upper left, regardless of how it has been moved by hand using the little dots (FIG. 26). When everything is ready, the producer hits the GO Key and the data that have been entered will be sent into the database to be seen on the air talent's info screen and in the lower right of all the Call Computer CAT screens. The Go button will change to STOP, and the caller info area will also go red, so it is easy to tell that the call has been cleared for air (FIG. 27). When the call is completed, hit stop, enter any post call notes, and then hit Ready to begin again. When the programs behind the CAT overlay may get out of position, the producer can simply minimize the CAT by hitting the minimize button, slide the displays back where they belong, and then restore the CAT overlay by clicking it in the control bar at the bottom of the screen.

The CAT module can include other buttons:

Hide Text, which the producer would use if there was something on the caller screen that you didn't want to distract from with the text overlay;

Turn Skype® Off, which is used during set up to isolate a different machine by turning Skype® off on all the others;

Turn Internet Off, which also turns Skype® off because it uses the web and is used to completely isolate the machine for testing;

Turn Audio ID On/Off plays the audio ID just for this computer and is used in set up and testing. It flashes red when running.

Restart Audio Meter, which restarts the meters.

Restart Skype®, which shuts it down and restarts it completely, including login. The producer can see the Skype® name for this computer and the password at the top left of the CAT, just in case the auto login doesn't work and the IP video service must be logged-into manually.

Reset Video Converter, which restarts the video converter software and positions the yellow box in the upper screen back to its starting position. The producer can use this if the yellow box has been changed to crop a prior caller.

In yet another embodiment, the caller queue system 10 described above may permit individual or private/secure connections between two or more callers or participants. According to one embodiment, the caller queue system may be a complete system that allows an unlimited number of callers to indicate that they wish to be connected to another caller (known or unknown) interested in a certain topic, such as a personal or dating service. In yet other embodiments, the caller queue system may allow callers to connect to doctors, attorneys, counselors, or any other service. As described above with the caller queue system 10, the callers in the queue may be pre-screened, for content as well as a technical quality check. Furthermore, even in the individual connection embodiment, the caller queue system may prioritize and pre-screened callers before connecting the caller to a video call computer or another caller device for an individual or private connection video or voice conference. In this embodiment, the call computer 22 may be smartphone, tablet, laptop, or other device capable of video or voice conferencing. The caller queue system sorts callers and then determines the best connection to a call computer or another caller device. The system may automatically determine the best video characteristics to connect caller devices or a caller device with a call computer.

Instead of connecting directly to a another video call computer or call device for an individual or group conference, callers would connect to a virtual "waiting room." In one embodiment, the waiting room would be a website hosted by a local or remote server. Callers could connect their video caller device to the website via a web page button or hyperlink or an application on the device. The caller device may be a smartphone, tablet, personal computer, or any computing device. While on the waiting room website, the caller queue system could request certain information from the caller that would be used to prioritize the callers in a queue and match callers with a call computer or another call device. If the individual connection is with a known call computer or caller device, then the system would hold the initial caller in the waiting room until a connection to the known call computer or caller device was established. If the call computer is unknown or random, then the requested information would relate to the caller's specific interest or topic to discuss with another caller. By way of example only and not by way of limitation, the requested information may include caller name, location, topic of discussion, description of media to upload to the program, any media to upload to the system, and selecting a desired IP video application (e.g., FaceTime, Skype, etc.) that the caller would prefer to use to connect to the call computer or other caller device. In other embodiments the system may automatically check the caller device and determine which applications are present on the caller device, such as FaceTime or Skype. In addition, the quality of the audio and video signal outputted from the caller's device can be checked while in the waiting room website, along with testing the connection to the server. Furthermore, the position of the caller in the video, the connection quality, the sound quality and the light exposure can be checked while the callers are in the virtual waiting room.

In one embodiment of the system and process, the information and caller status is relayed to a database which permits categorizing based on topics, caller history with the program (or any call-in program), location, or other caller characteristics. Once a caller is matched with an appropriate call computer or another caller device, whether determined automatically or by manager intervention, the caller's information is routed by a dispatcher application to the next available call computer or other call device capable of handling the caller's IP video application, e.g., a Facetime call would be routed to an Apple computer, and the outbound call to the caller is completed. The system may include a lookup table storing numbers or identifications of call computers and the applications that each call computer supports. The system may optimize the assignment of a call computer to a caller based upon the caller's video application and the capability of the available call computer.

When connected for an individual or private conference, a module, such as the queue managing module 18 or the call tracking module 19 may be provided with the caller's name and topic information, which automatically populates a text overlay and host topic screens, subject to call screener approval. When the screener completes the necessary technical, content, and propriety checks, the caller is cleared in the normal manner and becomes available for connection to an appropriate call computer or another caller device. In certain embodiments, the callers are automatically connected to one another based on topic or video configurations. When the callers wish to end the individual conference, they are returned to the caller queue web site and connected to another appropriate call computer or caller device. In certain embodiments, callers may be removed from the queue if the caller device disconnects or for bad behavior.

In one example, could connect to a virtual "waiting room" for an appointment with a professional or service provider, such as a doctor, nurse, insurance representative, sales representative or other type of counselor. While on the waiting room website, the caller queue system could request certain information from the caller that would be used to prioritize the callers in a queue and match callers with a call computer or device of a professional/counsel. While in the waiting room, the system could request information from the caller including medical history, health related symptoms, the purpose of the call, etc. In one example, the caller's medical history could be accessible by the caller queue system. In one embodiment of the system and process, the information and caller status is relayed to a database which permits categorizing based on topics, caller history, medical history, location, or other caller characteristics. In this example, once a caller is matched with an appropriate call computer, such as a specific doctor or nurse specializing in the caller's medical problem, the caller's information is routed by a dispatcher application to the next available call computer or other call device capable of handling the caller's IP video application.

In this example, when a screener completes the necessary technical, content, and propriety checks, the caller is cleared in the normal manner and becomes available for connection to an appropriate call computer or another caller device, such as a specific doctor or nurse. In certain embodiments, the callers are automatically connected to one another based on topic or video configurations. When the callers wish to end the individual conference or when it is determined that another specialist, such as another doctor would be more appropriate to talk with the caller, the caller is returned to the caller queue web site and connected to another appropriate call computer or caller device of another doctor or specialist. In one embodiment, callers may continue to be returned to the waiting room after speaking with one specialist/counselor and wait to speak with another specialist/counselor.

While particular embodiments of the invention have been illustrated and described in detail herein, it should be understood that various changes and modifications might be made to the invention without departing from the scope and intent of the invention. The embodiments described herein are intended in all respects to be illustrative rather than restrictive. Alternate embodiments will become apparent to those skilled in the art to which the present invention pertains without departing from its scope. For example, Skype® is used as an example of an internet protocol video service, but other branded and generic IP video services and applications may be substituted.

From the foregoing it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the appended claims. A number of embodiments of the invention have been described. Nevertheless, it will be understood that various modifications may be made without departing from the spirit and scope of the invention. For example, although an embodiment shows that a Call CPU can be dedicated to each caller, a Call CPU can handle the communication and video/audio transmission of more than one caller, each caller via a separate internet video connection.

Other embodiments are within the scope of the following claims.

What is claimed is:

1. A video caller system, comprising:
    a plurality of video caller's devices;
    a waiting room server that, prior to completion of a video call, connects to the plurality of caller devices over a network, the waiting room server provides content to the plurality of video caller's devices and records input received from the plurality of video caller's devices;
    a queue managing module in communication with the waiting room server, the queue managing module prioritizes the plurality of video caller's devices in a queue prior to connection of the respective video call based on the input received from the plurality of video caller's devices;
    a call tracking module including a graphic user interface on at least one display used by a screener that allows the screener to prescreen at least one of the plurality of video caller's devices in the queue and reprioritize the plurality of video caller's devices in the queue;
    a video call central processing unit that connects with the video caller's device at the top of the queue to establish a video call.

2. The system of claim 1, further comprising a caller database in communication with the queue managing module, the caller database stores the input received from the plurality of video caller's devices and stores the queue of the plurality of video caller's devices prior to the connection of the respective video call.

3. The system of claim 1, further comprising a video call acquisition technology server in communication with the queue managing module receives information for the video caller's device at the top of the queue and initiates a video connection between the video caller's devices identified at the top of the queue to the video call central processing unit.

4. The system of claim 1, wherein at least one of the plurality of video caller's devices is a smartphone providing data and IP video connectivity across the open internet without circuit switched or similar restrictive network requirements.

5. The system of claim 1, wherein the plurality of video caller's devices include an application stored in memory and the plurality of video caller's devices connect to the waiting room server by using the application prior to completion of the actual video call.

6. The system of claim 1, wherein the network is the open Internet or other open network without need for circuit switched or similar restrictive network requirements.

7. The system of claim 1, further comprising a waiting room website hosted by the waiting room server, and the plurality of video caller's devices connect to the waiting room server through the waiting room website prior to connection of the respective video call or calls.

8. The system of claim 7, wherein the content provided by the waiting room server to the plurality of video caller's devices includes a live feed of a video & audio program to the plurality of video caller's devices connected to the waiting room server prior to connection of the respective video call or calls.

9. The system of claim 1, wherein the content provided by the waiting room server to the plurality of video caller's devices includes questions related to users of the plurality of video caller's devices prior to connection of the respective video call or calls.

10. The system of claim 1, wherein, prior to connection of the respective video call or calls, the content provided by the waiting room server to the plurality of video caller's devices includes content-related terms and conditions required prior to completion of the respective video call or calls.

11. The system of claim 1, wherein, prior to connection of the respective video call or calls, the waiting room server performs audio and video quality checks on the plurality of video caller's devices.

12. The system of claim 1, wherein, prior to connection of the respective video call or calls, the queue managing module automatically prioritizes the plurality of video caller's devices in the queue based on input received from the plurality of video caller's devices along with input from the production team.

13. The system of claim 1, wherein, prior to connection of the respective video call or calls, the queue managing module prioritizes the plurality of video caller's devices in the queue at the direction of the screener.

14. The system of claim 13, further comprising a call tracking module in communication with the queue manager prior to connection of the respective video call or call.

15. A video call-in process comprising prior to connection of the respective video call or calls:
    connecting a plurality of video calls from different callers to a waiting room server over a network;
    collecting information from the different callers;
    prioritizing the plurality of video callers from different callers in a queue based on the information collected from the different callers;
    reprioritizing the plurality of video calls in the queue at the direction of a screener or producer prior to connection of the respective video call or calls;
    storing information regarding callers in the queue in a database connected to the waiting room server; and
    selecting the caller at the top of the queue to establish a video call.

16. The process of claim 15, further comprising connecting the device of the caller at the top of the queue to a video call central processing unit to establish the video call.

17. The process of claim 15, wherein, prior to connection of the respective video call or calls, connecting a plurality of video calls to a waiting room website hosted by the waiting room server.

18. The process of claim 15, further comprising providing content to the different callers over the network prior to connection of the respective video call or calls.

19. The process of claim 18, wherein providing content includes providing a live feed of a video call-in television broadcast to waiting callers prior to connection of the respective video call or calls.

20. The process of claim 18, wherein providing content includes providing questions to the different callers prior to connection of the respective video call or calls.

21. The process of claim 18, wherein providing content includes providing content related terms and conditions for participating in the video call-in process prior to connection of the respective video call or calls.

22. The process of claim 21, further comprising permitting a caller to check off their agreement to the terms and conditions and registering this with a central database prior to connection of the respective video call or calls.

23. The process of claim 15, further comprising testing audio and video quality of the plurality of video calls from different callers prior to connection of the respective video call or calls for air using the video call central processing unit.

24. The process of claim 15, wherein prioritizing the plurality of video calls from different callers in the queue prior to connection of the respective video call or calls occurs automatically by using a queue managing module.

25. The process of claim 15, wherein, prior to connection of the respective video call or calls, prioritizing the plurality of video callers from different callers in the queue at the direction of the screener or producer.

26. The process of claim 15, further comprising permitting a caller, prior to connection of the respective video call or calls, to choose a Video over IP application they would like to use to complete the video call.

27. The process of claim 15, further comprising permitting a caller to vote on a topic or answer a question prior to connection of the respective video call or calls.

28. The process of claim 27, further comprising permitting a producer to propose questions to the callers in the queue and to receive and tally response data prior to connection of the respective video call or calls.

29. The process of claim 27, further comprising determining in real time the vote or answer given prior to connection of the respective video call or calls.

30. The process of claim 15, further comprising permitting a live textual crawl to be superimposed on the return video signal prior to connection of the respective video call or calls.

31. The process of claim 15, further comprising permitting a caller in the queue to text chat with other callers in the queue prior to connection of the respective video call or calls.

32. The process of claim 15, further comprising permitting an automatic centering image to be displayed to the caller prior to connection of the respective video call or calls to assist the caller in aligning their camera position.

33. The process of claim 15, further comprising automatically performing quality control measurements prior to connection of the respective video call or calls with the video call central processing unit to provide feedback to caller about lighting and video.

34. The process of claim 15, prior to connection of the respective video call or calls, further comprising automatically performing quality control measurements to provide testing of microphone and sound.

35. The process of claim 15, prior to connection of the respective video call or calls, further comprising displaying advertisements to callers connected to the waiting room server.

36. The process of claim 35, prior to connection of the respective video call or calls, further comprising collecting measurements concerning the viewing of the advertisements while the video caller is in the waiting room and collected centrally.

37. The process of claim 35, wherein advertisements are based upon demographic information in a database about the caller.

38. The process of claim 15, further comprising permitting the caller to upload media while in the waiting room prior to connection of the respective video call or calls.

39. The process of claim 38, further comprising permitting a caller to make a recording of themselves prior to connection of the respective video call or calls.

40. The process of claim 39, wherein a producer aggregates media uploaded through the waiting room prior to connection of the respective video call(s).

41. The process of claim 38, wherein the caller describes the uploaded media while in the waiting room prior to connection of the respective video call(s).

42. The process of claim 15, further comprising connecting the caller in the waiting room and at the top of the queue through their respective video call device to a video call central processing unit capable of supporting a video application selected by the caller.

43. The process of claim 42, further comprising disconnecting the caller from the video call central processing unit and returning the caller to the queue and the waiting room.

44. The process of claim 15, further comprising removing the caller from the queue if the caller's device is disconnected from the waiting room server.

45. The process of claim 15 further comprising a video caller entering the waiting room queue directly via a video caller management system web site.

46. The process of claim 15 comprising a video caller entering the waiting room queue indirectly through a link attached or embedded in another web site.

47. The process of claim 15 comprising a video caller entering the waiting room queue indirectly through a web address that is part of a private text message.

48. The process of claim 15 comprising a video caller entering the waiting room queue indirectly through a web address that is part of an email message.

49. The process of claim 15 comprising a video caller entering the waiting room queue indirectly through a web address that is broadcast or otherwise made available to a plurality of potential callers via social media outlets.

50. The process of claim 15 wherein the video caller management system populates an unrelated video call application with connection data and automatically triggers a video connection between the video call central processing unit and the video caller's device.

51. The process of claim 15 wherein the video caller management system populates an unrelated video call application with connection data in preparation for manual triggering a video connection between the video call central processing unit and the video caller's device.

52. The process of claim 15 wherein the video caller management system causes transmission of "meet me" codes to both the video call central processing unit and the video caller's device for the purpose of completing a video using an unrelated third party video call application.

53. The process of claim 15 wherein the video caller management system causes transmission of "meet me" codes to both the video call central processing unit and the video caller's device for the purpose of completing a video using a video call application running on a proprietary server related to or under common control of the video caller management system.

54. A process of claim 15 whereby the video caller in the waiting room is provided the ability to create and transmit a social media message promoting the caller's upcoming on-air appearance.

55. A process of claim 54 wherein the social media message is pre-written.

56. A process of claim 15 wherein the waiting room server determines the type of device being used by the caller.

57. A process of claim 15 wherein the waiting room server determines the video application available on the video caller's device.

58. A process of claim 15 wherein the call producer and video caller may communicate through chat messages between the call producer's terminal and the video caller's device via prior to connection of the video call for air via the waiting room server.

59. A process of claim 15 which enables the triggering of a video connection between the call computer and the video caller's device via a variety of $3^{rd}$ party IP based video applications.

* * * * *